US012558765B2

(12) United States Patent
Myers et al.

(10) Patent No.: US 12,558,765 B2
(45) Date of Patent: Feb. 24, 2026

(54) FASTENER TOOL WITH DRIVE SPEED ADJUSTMENT

(71) Applicant: BLACK & DECKER, INC., New Britain, CT (US)

(72) Inventors: Merrill Myers, Parkville, MD (US); Alex Dignan, Towson, MD (US); Dylan Parker, Towson, MD (US)

(73) Assignee: BLACK & DECKER INC., New Britain, CT (US)

( * ) Notice: Subject to any disclaimer, the term of this patent is extended or adjusted under 35 U.S.C. 154(b) by 21 days.

(21) Appl. No.: 18/480,911

(22) Filed: Oct. 4, 2023

(65) Prior Publication Data

US 2025/0114927 A1 Apr. 10, 2025

(51) Int. Cl.
*B25C 1/00* (2006.01)
*B25C 1/06* (2006.01)
*B25F 5/00* (2006.01)

(52) U.S. Cl.
CPC ................ *B25C 1/06* (2013.01); *B25C 1/001* (2013.01); *B25F 5/001* (2013.01)

(58) Field of Classification Search
CPC ............ B25C 1/001; B25C 1/06; B25F 5/001
See application file for complete search history.

(56) References Cited

U.S. PATENT DOCUMENTS

| | | | | |
|---|---|---|---|---|
| 4,323,127 A | 4/1982 | Cunningham | | |
| 6,796,475 B2 * | 9/2004 | Adams | H02P 3/08 | 227/129 |
| 6,796,476 B2 | 9/2004 | Birk et al. | | |
| 6,971,567 B1 * | 12/2005 | Cannaliato | B25C 1/06 | 173/205 |
| 7,213,732 B2 * | 5/2007 | Schell | B25C 1/043 | 227/8 |
| 7,866,521 B2 * | 1/2011 | Gross | B25C 1/001 | 227/135 |
| 9,744,657 B2 * | 8/2017 | Baron | B25C 5/15 | |
| 9,827,658 B2 * | 11/2017 | Gregory | B25C 1/001 | |
| 10,427,284 B2 * | 10/2019 | Kato | B25C 5/15 | |
| 10,926,385 B2 * | 2/2021 | Myers | B25C 1/008 | |
| 11,097,408 B2 * | 8/2021 | Akiba | B25C 1/06 | |
| 2002/0185514 A1 * | 12/2002 | Adams | B25C 1/008 | 227/2 |
| 2003/0192933 A1 * | 10/2003 | Pedicini | B25C 1/06 | 227/131 |

(Continued)

*Primary Examiner* — Anna K Kinsaul
*Assistant Examiner* — David G Shutty
(74) *Attorney, Agent, or Firm* — Pillsbury Winthrop Shaw Pittman LLP

(57) ABSTRACT

A fastener tool that drives a fastener into a workpiece includes a housing, a nose assembly, a driver, a motor, a flywheel, one or more sensors, and a controller. The controller is configured to adjust a speed of the driver based on 1) a difference between a first angular velocity of the flywheel measured by the one or more sensors at or before the start of the drive commencement and a second angular velocity measured by one or more sensors after the start of the drive commencement; or 2) a time difference between a first time after the start of the drive commencement when the driver and the flywheel are in engagement with each other and when the driver and the flywheel are moving at the same speed and a second time when the characteristic of the motor meets a predetermined threshold.

9 Claims, 9 Drawing Sheets

(56) References Cited

U.S. PATENT DOCUMENTS

| | | | | |
|---|---|---|---|---|
| 2020/0039044 | A1 | 2/2020 | Akiba | |
| 2022/0161404 | A1* | 5/2022 | Lim | B25C 1/003 |
| 2024/0009820 | A1* | 1/2024 | Palm | B25C 5/15 |

* cited by examiner

FASTENER TOOL WITH DRIVE SPEED ADJUSTMENT

FIELD

The patent application relates, in general, to the field of power tools. In particular, this patent application relates to portable fastening or driving tools, such as nailers and staplers.

BACKGROUND

Fastener devices/tools, such as nailers and staplers, are relatively commonplace in the construction trades. Several types of nailers have been introduced to the market in an effort to satisfy the demands of modern consumers. Some of the nailers use a spring-loaded device to push fasteners into position such that a drive mechanism or driver may then be actuated to fire or push a fastener into a workpiece.

The fastener device/tool may typically include a drum for storing a coil of collated fasteners and a feed mechanism or feeder configured to feed the fasteners into a nosepiece/nose assembly of the fastener tool. These fastener tools are known in the art for attaching a series or a succession of nails or fasteners into workpieces. The fastener tools can be electric, battery or pneumatic powered. The fastener tool can engage a transmission and a motor to drive a fastener/nail/staple into the workpiece.

Some fastener tools may include a flywheel to enable translation/movement of a driver. Some flywheel nailers have been designed to have the highest power requirement fastener/nail for every shot, regardless of actual energy output. Drive velocity/speed of the driver when firing a short fastener can be excessively high, causing unnecessary or premature wear on a drive system/an engine components, for example, return spring and bumpers. Some fastener tools may have incorporated a speed select switch that is configured to engageable by a user but users do not perceive any immediate benefit of the reduced speed and the data indicates that some users simply leave the fastener tool in high power/speed all the time.

The present patent application provides improvements in the fastener tools.

SUMMARY

One aspect of the present patent application provides a fastener tool that drives a fastener into a workpiece. The fastener tool comprises a housing, a nose assembly, a driver, a motor, a flywheel, one or more sensors, and a controller. The nose assembly is connected with the housing. The nose assembly has a drive channel into which the fastener to be driven into the workpiece is fed. The drive channel has a drive axis. The driver is configured to be movable along the drive axis to engage and drive the fastener in the drive channel into the workpiece. The motor and the flywheel are disposed in the housing. The flywheel is configured to be driven by the motor and is configured to transmit energy to the driver to cause the driver to move along the drive axis. The one or more sensors is operatively connected to at least one of the flywheel and the motor. The one or more sensors is configured to measure and output at least (a) a signal indicative of an angular velocity of the flywheel or (b) a signal indicative of a characteristic of the motor. The controller has one or more processors. The controller is operatively connected to the motor and the one or more sensors. The controller is configured to move the flywheel into engagement with the driver at a start of a drive commencement such that energy is transferred from the flywheel to the driver for driving the fastener in the drive channel into the workpiece. The controller is configured to adjust a speed of the driver based on a difference between a first angular velocity of the flywheel measured by the one or more sensors at or before the start of the drive commencement and a second angular velocity measured by the one or more sensors after the start of the drive commencement.

Implementations of the foregoing aspects may include one or more of the following features.

The controller may be configured to adjust the speed of the driver to varying characteristics of the workpiece. The varying characteristics of the workpiece may include one or more of the following: a thickness of the workpiece, a positioning of the workpiece with respect to the fastener tool, a material of the workpiece, a density of the workpiece, or a type of a joint in the workpiece.

The fastener tool may further comprise a depth adjustment assembly that is configured to enable a user to perform at least one of the following: select a depth adjustment setting to adjust a depth at which the fastener tool drives the fastener into the workpiece and adjust a penetration depth of the fastener into the workpiece. The controller may be configured to adjust the speed of the driver to varying user adjustable depth adjustment settings of the depth adjustment assembly.

The controller may be configured to adjust the speed of the driver to varying characteristics of the fastener. The varying characteristics of the fastener may include one or more of the following: a length of the fastener, a material of the fastener, or a thickness of the fastener.

The first angular velocity may include a set measurement point in time at or before the start of the drive commencement.

The second angular velocity may include one or more of the following: (a) a first dynamic measurement point in time that is after the start of the drive commencement, wherein the first dynamic measurement point is determined when an angular acceleration of the flywheel meets an angular acceleration predetermined threshold; or (b) a second dynamic measurement point in time that is after the start of the drive commencement, wherein the second dynamic measurement point is determined when an angular jerk of the flywheel meets a flywheel angular jerk predetermined threshold.

The fastener tool may further comprise an actuator that may be operatively connected to the controller and may be configured to move the driver into engagement with the flywheel such that energy is transferred from the flywheel to the driver and to disengage the flywheel from the driver. The actuator may be a drive actuator. The drive actuator may include a drive solenoid.

The fastener tool may further comprise a feed actuator and a feeder. The controller may be operatively connected to the feed actuator and the feeder and may be configured to implement a firing sequence for driving a lead fastener into the workpiece using the driver and for feeding the lead fastener into the nose assembly using the feeder. The feed actuator may include a feed solenoid and may be configured to move the lead fastener into the nose assembly. The firing sequence may include a first electric pulse to the drive actuator and a second electric pulse to the feed actuator.

The fastener tool may further comprise a magazine coupled to the nose assembly and disposed in the housing. The magazine may be configured to carry a supply of fasteners through a feed channel along a feed channel direction toward the nose assembly. The feeder may be operatively connected with the magazine and may be configured to advance the fastener in a feed direction through the magazine and into the drive channel prior to driving the fastener into the workpiece.

The controller may be configured to control a supply of power from a power source to the motor to initiate a drive stroke. The drive stroke may include a time from which the driver is activated to engage and drive the fastener in the drive channel into the workpiece to a time until the driver is retracted along the drive axis to clear the drive channel and to allow for feeding of a subsequent fastener into the drive channel.

Another aspect of the present patent application provides a fastener tool that drives a fastener into a workpiece. The fastener tool comprises a housing, a nose assembly, a driver, a motor, a flywheel, one or more sensors, and a controller. The nose assembly is connected with the housing. The nose assembly has a drive channel into which the fastener to be driven into the workpiece is fed. The drive channel has a drive axis. The driver is configured to be movable along the drive axis to engage and drive the fastener in the drive channel into the workpiece. The motor and the flywheel are disposed in the housing. The flywheel is configured to be driven by the motor and is configured to transmit energy to the driver to cause the driver to move along the drive axis. The one or more sensors is operatively connected to at least one of the flywheel and the motor. The one or more sensors is configured to measure and output at least (a) a signal indicative of an angular velocity of the flywheel or (b) a signal indicative of a characteristic of the motor. The controller has one or more processors. The controller is operatively connected to the motor and the one or more sensors. The controller is configured to move the flywheel into engagement with the driver at a start of a drive commencement such that energy is transferred from the flywheel to the driver for driving the fastener in the drive channel into the workpiece. The controller is configured to adjust a speed of the driver based on a time difference between a first time after the start of the drive commencement when the driver and the flywheel are in engagement with each other and when the driver and the flywheel are moving at the same speed and a second time when the characteristic of the motor meets a predetermined threshold.

Implementations of the foregoing aspects may include one or more of the following features.

The controller may be configured to adjust the speed of the driver to varying characteristics of the workpiece. The varying characteristics of the workpiece may include one or more of the following: a thickness of the workpiece, a positioning of the workpiece with respect to the fastener tool, a material of the workpiece, a density of the workpiece, or a type of a joint in the workpiece.

The fastener tool may further comprise a depth adjustment assembly that is configured to enable a user to perform at least one of the following: select a depth adjustment setting to adjust a depth at which the fastener tool drives the fastener into the workpiece and adjust a penetration depth of the fastener into the workpiece. The controller may be configured to adjust the speed of the driver to varying user adjustable depth adjustment settings of the depth adjustment assembly.

The controller may be configured to adjust the speed of the driver to varying characteristics of the fastener. The varying characteristics of the fastener may include one or more of the following: a length of the fastener, a material of the fastener, or a thickness of the fastener.

The first time may include one of the following: (1) a first time set measurement that is determined when the driver and the flywheel are in engagement with each other and when the driver and the flywheel are moving at the same speed; (2) a first time, first dynamic measurement that is determined when an angular acceleration of the flywheel meets a first angular acceleration predetermined threshold; or (3) a first time, second dynamic measurement that is determined when an angular jerk of the flywheel meets a first flywheel angular jerk predetermined threshold.

The second time may include one of the following: (1) a second time, first set measurement that is determined when an angular velocity of the flywheel meets a first angular velocity predetermined threshold; (2) a second time, first dynamic measurement that is determined when the angular velocity of the flywheel meets a second angular velocity predetermined threshold, wherein the second angular velocity predetermined threshold includes a function with dependent variables including a first time angular velocity of the flywheel that is measured at the first time; (3) a second time, second set measurement that is determined when the angular acceleration of the flywheel meets a second angular acceleration predetermined threshold; or (4) a second time, second dynamic measurement that is determined when the angular jerk of the flywheel meets a second flywheel angular jerk predetermined threshold.

The predetermined threshold may be the second flywheel angular jerk predetermined threshold.

The predetermined threshold may be the second angular acceleration predetermined threshold. The first flywheel angular jerk predetermined threshold may be different from the second flywheel angular jerk predetermined threshold.

The first flywheel angular jerk predetermined threshold may be the same as the second flywheel angular jerk predetermined threshold.

The first flywheel angular acceleration predetermined threshold may be different from the second flywheel angular acceleration predetermined threshold.

The first flywheel angular acceleration predetermined threshold may be the same as the second flywheel angular acceleration predetermined threshold.

The fastener tool may further comprise an actuator that may be operatively connected to the controller and may be configured to move the driver into engagement with the flywheel such that energy is transferred from the flywheel to the driver and to disengage the flywheel from the driver. The actuator may be a drive actuator. The drive actuator may include a drive solenoid.

The fastener tool may further comprise a feed actuator and a feeder. The controller may be operatively connected to the feed actuator and the feeder and may be configured to implement a firing sequence for driving a lead fastener into the workpiece using the driver and for feeding the lead fastener into the nose assembly using the feeder. The feed actuator may include a feed solenoid and may be configured to move the lead fastener into the nose assembly. The firing sequence may include a first electric pulse to the drive actuator and a second electric pulse to the feed actuator.

The fastener tool may further comprise a magazine coupled to the nose assembly and disposed in the housing. The magazine may be configured to carry a supply of fasteners through a feed channel along a feed channel direction toward the nose assembly. The feeder may be operatively connected with the magazine and may be configured to advance the fastener in a feed direction through the magazine and into the drive channel prior to driving the fastener into the workpiece.

The controller may be configured to control a supply of power from a power source to the motor to initiate a drive stroke. The drive stroke may include a time from which the driver is activated to engage and drive the fastener in the drive channel into the workpiece to a time until the driver is retracted along the drive axis to clear the drive channel and to allow for feeding of a subsequent fastener into the drive channel.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise.

Other aspects, features, and advantages of the present patent application will become apparent from the following detailed description, the accompanying drawings, and the appended claims.

DETAILED DESCRIPTION

Figure 1:
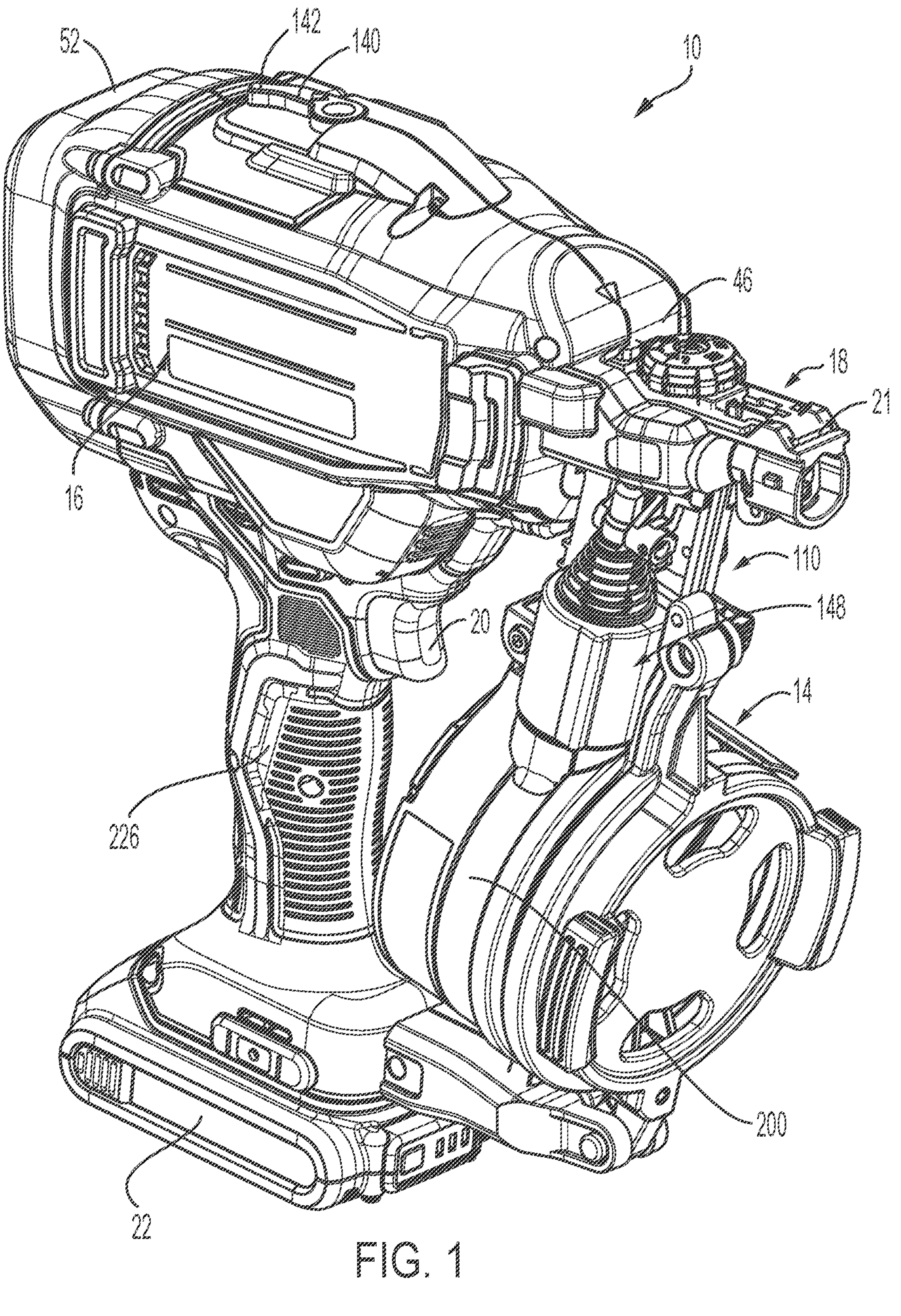
FIG. 1 shows a perspective view of an exemplary fastener tool in accordance with an embodiment of the present patent application.

In one embodiment of the present patent application, referring to FIGS. 1-6, a fastener tool 10 that drives a fastener (not shown) into a workpiece (not shown) is provided. The fastener tool 10 comprises a housing 16, a nose assembly 18, a driver 26, a motor 32, a flywheel 34, one or more sensors S, and a controller 38. The nose assembly 18 is connected with the housing 16. The nose assembly 18 has a drive channel DC into which the fastener to be driven into the workpiece is fed. The drive channel DC has a drive axis 29. The driver 26, the motor 32, the flywheel 34, the controller 38, the drive channel DC and the drive axis 29 are clearly shown in FIG. 4. The driver 26 is configured to be movable along the drive axis 29 to engage and drive the fastener in the drive channel DC into the workpiece. The motor 32 and the flywheel 34 are disposed in the housing 16. The flywheel 34 is configured to be driven by the motor 32 and is configured to transmit energy to the driver 26 to cause the driver 26 to move along the drive axis 29. The one or more sensors S is operatively connected to at least one of the flywheel 34 and the motor 32. The one or more sensors S is configured to measure and output at least (a) a signal indicative of an angular velocity of the flywheel 34 or (b) a signal indicative of a characteristic of the motor 32. The controller 38 has one or more processors P. The controller 38 is operatively connected to the motor 32 and the one or more sensors S. The controller 38 is configured to move the flywheel 34 into engagement with the driver 26 at a start of a drive commencement such that energy is transferred from the flywheel 34 to the driver 26 for driving the fastener in the drive channel DC into the workpiece. The controller 38 is configured to adjust a speed of the driver 26 based on 1) a difference between a first angular velocity of the flywheel 34 measured by the one or more sensors S at or before the start of the drive commencement and a second angular velocity measured by the one or more sensors S after the start of the drive commencement; or 2) a time difference between a first time after the start of the drive commencement when the driver 26 and the flywheel 34 are in engagement with each other and when the driver 26 and the flywheel 34 are moving at the same speed and a second time when the characteristic of the motor 32 meets a predetermined threshold.

In one embodiment, the controller 38 is configured to adjust a speed of the driver 26 based on a difference between a first angular velocity of the flywheel 34 measured by the one or more sensors S at or before the start of the drive commencement and a second angular velocity measured by the one or more sensors S after the start of the drive commencement. In one embodiment, the controller 38 is configured to adjust a speed of the driver 26 based on a time difference between a first time after the start of the drive commencement when the driver 26 and the flywheel 34 are in engagement with each other and when the driver 26 and the flywheel 34 are moving at the same speed and a second time when the characteristic of the motor 32 meets a predetermined threshold.

This patent application relates to corded or cordless, portable fastener driving tools, such as a nailers and staplers, and improvements made therein for driving capabilities of the fastener tool 10.

The fastener tool 10 may be interchangeably referred to as a fastener driver, a fastener device, a fastener driving tool, a fastener driving device, a nail gun, a stapler gun, a nailer, a device, or a tool that is adapted to drive fastener(s) into the workpiece. The fasteners may be staples, U-shaped staples, brads, nails, fasteners, and the like. The fastener and the nail may be used interchangeably herein. In one embodiment, the fasteners may be collated. The fastener tool 10 may be a cordless power tool, in accordance with an embodiment. In one embodiment, the fastener tool 10 is a nailer or a nail gun configured to drive nail(s) into the workpiece.

This patent application provides a drive speed adjustment algorithm for the nailer 10, for example, a flywheel nailer. This patent application may also provide a nail/fastener length sensing algorithm for the flywheel nailer 10, for example, using/based on motor speed. These algorithms will be described in detail below. The flywheel nailer mechanism may generally have a wide variation in time from start to finish depending upon the application (e.g., nail length, nail type, density of the workpiece, orientation of the workpiece with respect to the nailer, other fastener characteristics described in detail below, other workpiece characteristics described in detail below, user depth drive settings, etc.).

The housing 16 may be formed from molded parts. In one embodiment, a first side part and a second side part of the housing 16 may be molded and joined together to encapsulate parts of a driving/drive mechanism and a feed mechanism (described in greater detail below) of the fastener tool 10 within the housing 16. The drive/driving mechanism may be interchangeably referred to as the driver or the driver assembly and the feed/feeder mechanism may interchangeably referred to as the feeder or feed/feeder assembly. The housing 16 may be made of extruded or molded plastic material, for example. The housing 16 may be formed from an Acrylonitrile Butadiene Styrene (ABS) plastic material. These examples materials of the housing 16 should not be limiting. Other materials, such as polycarbonates and/or combinations of materials, may also be used to form the housing 16. The housing 16 has a front end 46 and a back end 52. The housing 16 may include a handle 226 that is adapted to be gripped by the hand of an operator or a user. In one embodiment, the handle 226 is configured to extend between a top end and a bottom end of the housing 16. The housing 16 may also conventionally house a trigger 20 and the motor 32 with the driver 26, which may be selectively translated along the drive axis 29 to drive the fastener into the workpiece. Further details of the housing 16 are provided in commonly assigned U.S. Pat. No. 7,866,521 ("the '521 Patent") and U.S. Pat. No. 11,745,323 ("the '323 Patent"), each of which are commonly assigned and are incorporated by reference in their entirety.

The nose assembly 18 may extend from the housing 16 proximate the magazine 14 (described in detail below) and may be conventionally configured to engage the magazine 14 so as to sequentially receive fasteners therefrom. The nose assembly 18 may also serve in a conventional manner to guide the driver 26 and fastener when the fastener tool 10 has been actuated to install/drive the fastener into the workpiece. The nose assembly 18 may be interchangeably referred to as nosepiece or nosepiece assembly, and the magazine 14 may be interchangeably referred to as magazine assembly.

The nose assembly 18 may further include a contact trip assembly 21, which is described in detail below. In addition to the contact trip assembly 21, the nose assembly 18 may include a barrel 66 that forms a part of the drive channel DC for the driver 26 to move within an interior portion thereof and drive a fastener. The nose assembly 18 of the fastener tool 10 may include one, some, or all features as described in U.S. Pat. No. 9,827,658 ("the '658 Patent") and/or U.S. Pat. No. 10,926,385 ("the '385 Patent"), both of which are commonly assigned and are incorporated by reference herein in their entireties.

The driver 26 includes a driver blade at one end thereof. The driver 26 may be configured for translational movement within the drive channel DC along the drive axis 29. The driver 26 may also be configured to engage with and drive the lead fastener in the drive channel DC into a workpiece. The driver 26 may be made of any number of materials, including, but not limited to, aluminum, nickel, steel, stainless steel, and/or combinations thereof.

The driver 26 may include a drive cycle/sequence/stroke. The drive cycle may include a time from which the driver 26 is activated to engage and drive the fastener in the drive channel DC into the workpiece to a time until the driver 26 is retracted along the drive axis 29 to clear the drive channel DC and to allow for feeding of a subsequent fastener (e.g., by the feed mechanism/assembly) into the drive channel DC. That is, the nail/fastener driving/drive cycle may include time from the activation of the driver mechanism until the driver has partially returned far enough to allow feeding of the next/subsequent nail/fastener (i.e., the drive path/channel DC is cleared).

A drive system 19, associated with a drive actuator 36, is configured to selectively drive the driver 26 along the drive axis 29 (or path), to drive the nail or fastener into a workpiece. The drive system 19 (also interchangeably referred to herein as a drive motor assembly), may include the power source 25, the driver 26, an activation arm assembly 28, and a return mechanism 30. The activation arm assembly 28 may include the drive actuator 36, a carriage 44 (may include a pair of arm members 56 that can be spaced laterally apart, one on each side of the fastener tool 10), a roller assembly carrier, a follower arm 48, a roller assembly 40 (that includes a first roller 42 and a second roller 50), and a biasing mechanism 54. The activation arm assembly 28 and the return mechanism 30 are described in detail in the incorporated '323 Patent and, therefore, they will not be described in detail here.

In one embodiment, the energy/power source/assembly includes the motor 32, the flywheel 34, and the drive actuator 36. In one embodiment, the motor 32 is an outer rotor brushless motor, wherein the rotor is provided on an outside and the stator is provided on an inside thereof. The flywheel 34 may be coupled to an output shaft of the motor 32. The motor 32 may be operable for rotating the flywheel 34, for example, via a motor pulley, a belt and a flywheel pulley. The outer rotor of the motor 32 may be integrally formed with the flywheel 34.

The flywheel 34 may be driven by the motor 32. The flywheel 34 may be configured to transmit the power to the driver 26 to thereby cause the driver 26 to translate in the drive channel DC and along the drive axis 29.

Figure 7:
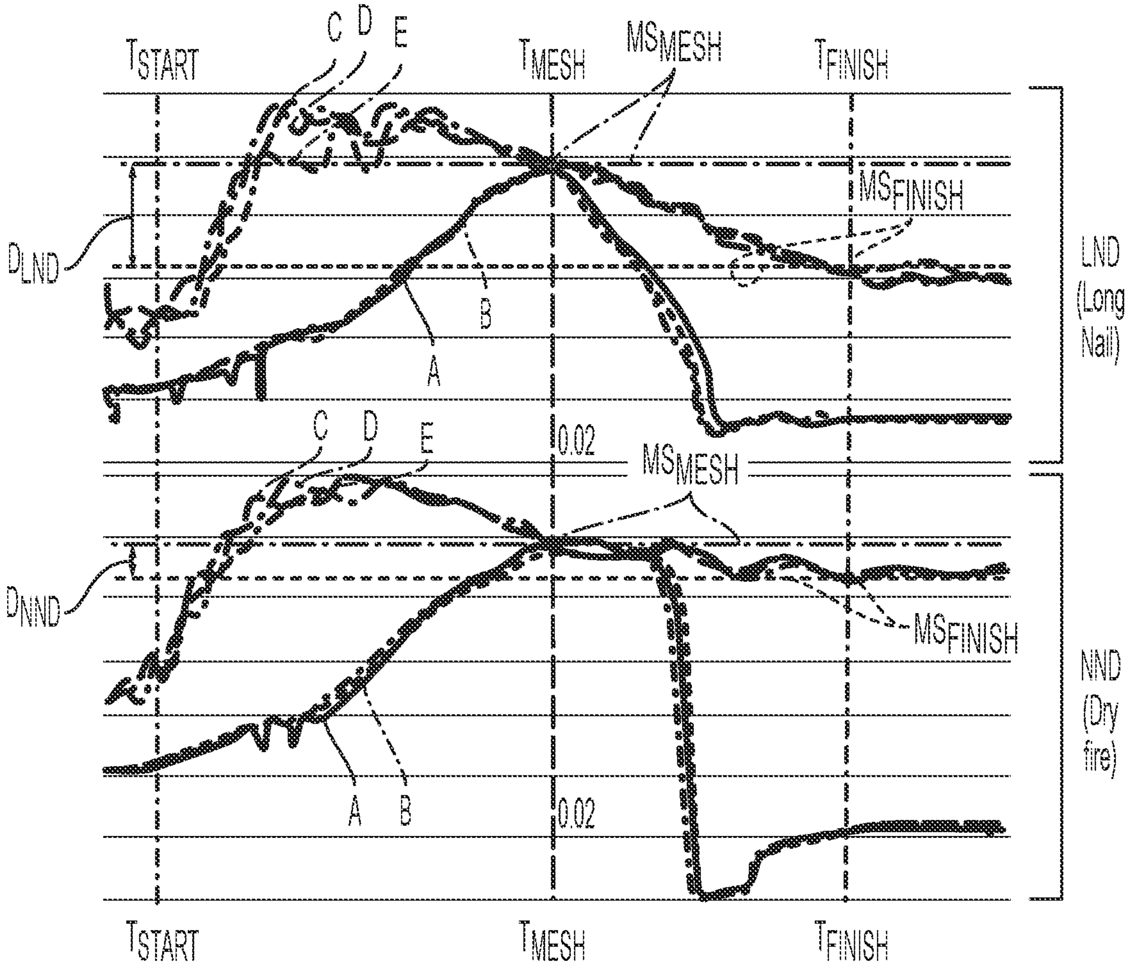
FIG. 7 shows graphical representation of motor speed vs time for a procedure of the fastener tool in which a controller is configured to adjust a speed of the driver based on a difference between a first angular velocity of the flywheel measured by one or more sensors at or before the start of a drive commencement and a second angular velocity measured by the one or more sensors after the start of the drive commencement in accordance with an embodiment of the present patent application.
Figure 8:
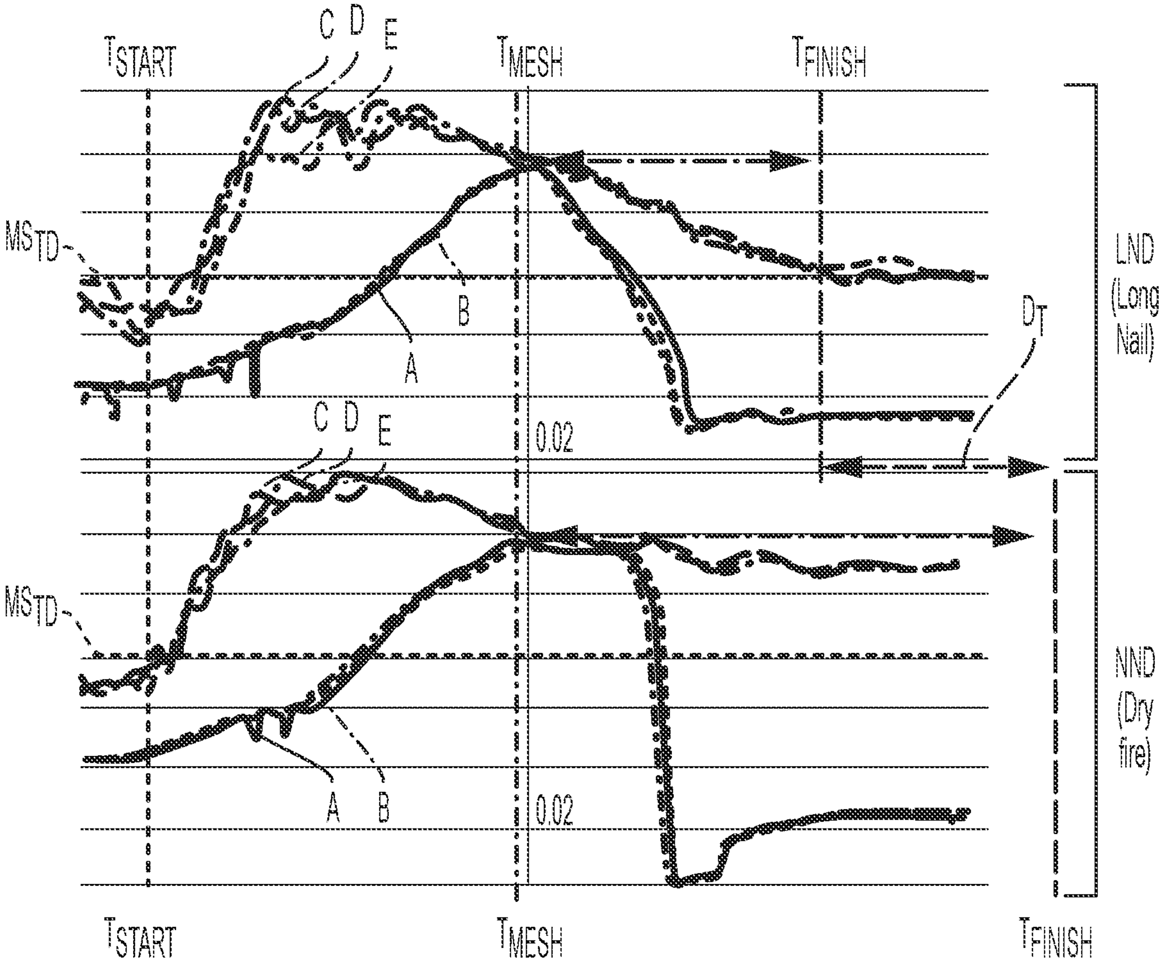
FIG. 8 shows graphical representation of motor speed vs time for a procedure of the fastener tool in which the controller is configured to adjust a speed of the driver based on a time difference between a first time after the start of the drive commencement when the driver and the flywheel are in engagement with each other and when the driver and the flywheel are moving at the same speed and a second time when the characteristic of the motor meets a predetermined threshold in accordance with another embodiment of the present patent application.
Figure 9:
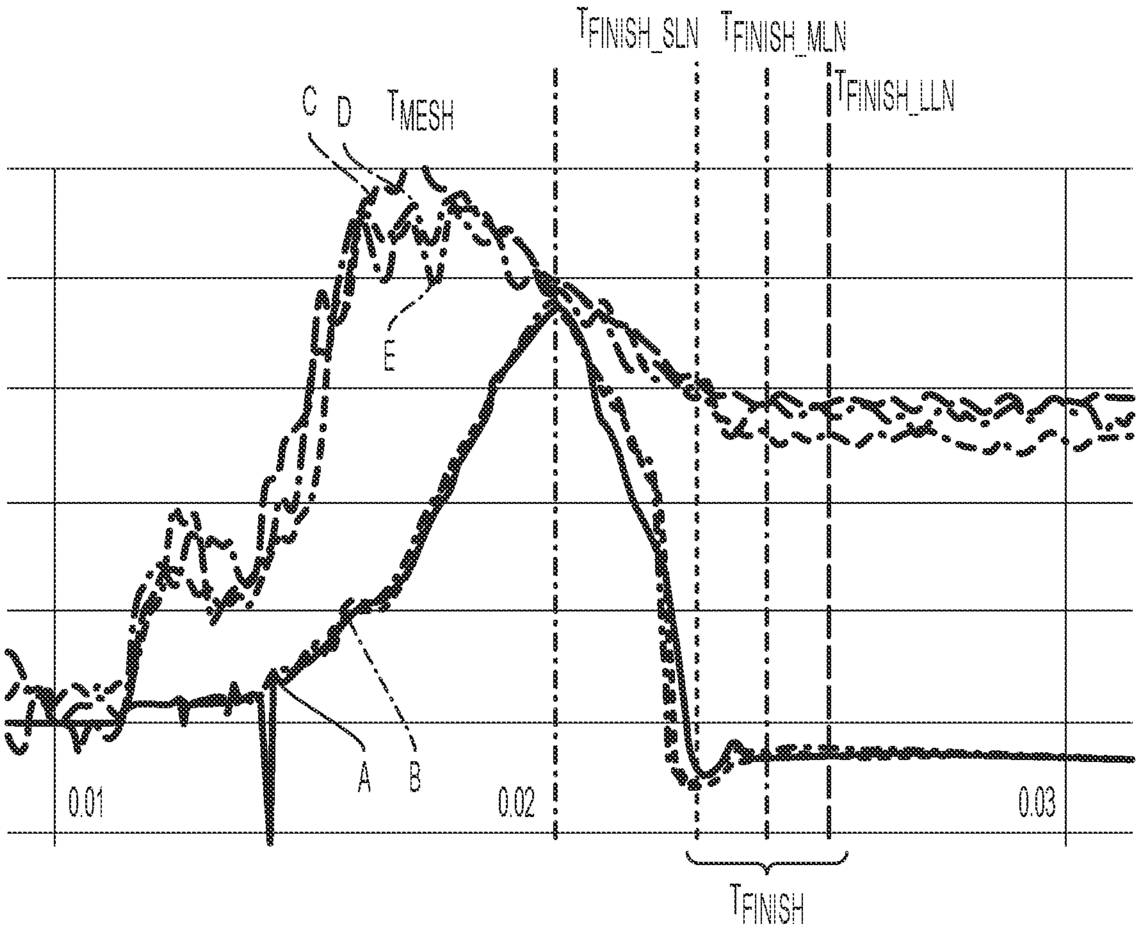
FIG. 9 shows a graphical representation of motor speed vs time for a procedure of the fastener tool in which motor speed sensing may be used to distinguishing different nail/fastener length in accordance with an embodiment of the present patent application.

The drive commencement, as used herein, refers to a time at which the driver 26 meshes/engages with the flywheel 34 (such that energy is transferred from the flywheel 34 to the driver 26 for driving the fastener in the drive channel DC into the workpiece). The drive commencement may take place at $T_{MESH}$ as shown in FIGS. 7-9. The time at which the drive commencement starts is shown as $T_{MESH}$ in FIGS. 7-9.

The controller 38 may be configured to move the flywheel 34 into engagement with the driver 26 at a start of the drive commencement such that energy is transferred from the flywheel 34 to the driver 26 for driving the fastener in the drive channel DC into the workpiece.

The one or more sensors S is operatively connected to the flywheel 34, the motor 32 or both. The one or more sensors S is configured to measure and output at least (a) a signal indicative of a characteristic of the flywheel 34 or (b) a signal indicative of a characteristic of the motor 32. That is, the one or more sensors S is configured to measure and output a signal indicative of a characteristic of the flywheel 34. The one or more sensors S is configured to measure and output a signal indicative of a characteristic of the motor 32. The one or more sensors S is configured to measure and output a signal indicative of a characteristic of the flywheel 34 and a signal indicative of a characteristic of the motor 32. The one or more sensors S is also operatively connected to the controller 38.

The one or more sensors S may include a sensor that is configured to sense the speed of the flywheel 34. The sensor S may be configured to sense a condition in the flywheel 34 that is indicative of a level of kinetic energy of an element in the flywheel 34 and to generate a sensor signal in response thereto. For example, the sensor S may be operable for sensing a speed of the output shaft of the motor 32 or a speed of the flywheel 34. As a person of ordinary skill in the art would appreciate from this patent application, the sensor S may sense the characteristic directly or indirectly. For example, the speed of the output shaft of the motor 32 or the speed of the flywheel 34 may be sensed directly, as through encoders, eddy current sensors or Hall effect sensors, or indirectly, as through the back electromotive force of the motor 32. The one or more sensors S that is configured to measure and output the signal indicative of a characteristic of the motor 32 may include at least one of the following: Hall effect sensor(s) and magnet(s) coupled to flywheel 34; inductive proximity sensor(s) and geometry on flywheel 34; variable reluctance sensor(s) and geometry on flywheel 34; optical sensor(s) and geometry on flywheel 34; and mechanical sensor(s) contacting steel geometry on flywheel 34.

Back electromotive force, which is produced when the motor 32 is not powered by the battery but rather driven by the speed and inertia of the components of the motor assembly (especially the flywheel 34) may be employed. The one or more sensors S that is configured to measure and output the signal indicative of a characteristic of the motor 32 may include at least one of the following: no sensor/an internal sensor (e.g., BEMF (Back-electromotive force) or CEMF (counter-electromotive force) and current signal processing from motor coils. Counter-electromotive force (counter EMF, CEMF, back EMF), is the electromotive force (EMF) manifesting as a voltage that opposes the change in current which induced it. CEMF is the EMF caused by electromagnetic induction.

The one or more sensors S may include a position detector that is associated with the motor 32 to output a position signal corresponding to the position of a rotor (at one place) of the motor 32. The position detector may be a magnetic sensor such as a hall sensor/element or a hall IC, for example, and a hall signal may be output as the position signal. The position signal output from the position detector may be input to the controller 38. The controller 38 may include an inverter circuit design to output a control signal to the motor 32, to control the rotation of the motor 32. In one embodiment, the inverter circuit has six switching elements for supplying driving current to the respective coils of the motor 32, wherein three of the switching elements are high-side switching elements and three of the switching elements are low-side switching elements.

The one or more sensors S may be configured to measure and output a signal indicative of a characteristic of the flywheel 34. The characteristic of the flywheel 34 may include an angular velocity of the flywheel 34. In one embodiment, the signal indicative of the characteristic of the flywheel 34 may include the signal indicative of the angular velocity of the flywheel 34. The angular velocity of the flywheel 34 may be defined as @ (e.g., measured in rad/s: radians per second). Kinetic energy or rotational energy stored in the flywheel 34 by rotation is generally proportional to the moment of inertia and the square of the angular velocity of the flywheel 34. The kinetic energy required for the driver 26 to drive a fastener may vary depending on the characteristics of a fastener and characteristics of a workpiece into which the fastener is driven. In one embodiment, the controller 38 is configured to adjust a speed of the driver 26 based on a difference between a first angular velocity of the flywheel 34 measured by the one or more sensors S at or before the start of the drive commencement and a second angular velocity measured by the one or more sensors S after the start of the drive commencement.

The one or more sensors S may be configured to measure and output a signal indicative of a characteristic of the motor 32. The characteristic of the motor 32 may include a Pulse Width Modulation (PWM) of the motor 32. The signal indicative of the characteristic of the motor 32 may include the signal indicative of the PWM of the motor 32. The characteristic of the motor 32 may include a current supplied to the motor 32. The signal indicative of the characteristic of the motor 32 may include the signal indicative of the current supplied to the motor 32.

The one or more sensors S that is configured to measure and output the signal indicative of a characteristic of the motor 32 may be arranged as incremental type. The one or more sensors S that is configured to measure and output the signal indicative of a characteristic of the motor 32 may be arranged as absolute type. The one or more sensors S that is configured to measure and output the signal indicative of a characteristic of the motor 32 may include multiple sensors to increase resolution.

The controller 38 may include one or more processors P. The controller 38 and circuitry may be provided at the back end 52 of the housing 16. The controller 38 may be provided in the form of a microprocessor and one or more circuit boards, for example, including relay module and one or more MOSFETs. The controller 38 may also be configured to operatively connect to and/or to communicate with the motor 32 and the one or more sensors S. The controller 38 may be programmed to provide at least one of power and control signals (e.g., electric pulses) over control lines to the drive actuator 36 and a feed actuator 148. That is, the drive actuator 36 and the feed actuator 148 are connected to the controller 38 via control lines. The controller 38 may be configured to operate both the driver 26 and the feeder 110. In one embodiment, the controller 38 may only be configured to operate the driver 26.

The controller 38 may be configured to receive input from the trigger 20, which affects movement of the driver 26 and a feed rod to load fasteners in the nose assembly 18 of the fastener tool 10. Upon receiving a signal from the trigger switch TS and an operation restricting mechanism (e.g., contact trip assembly 21) and its switch CTS, the controller 38 may be connected to the battery 22 to receive power therefrom and the drive actuator 36 may be activated. The controller 38 may signal the motor 32 to energize or activate for a predetermined amount of time (e.g., by applying voltage to the motor 32) before activating the drive actuator 36. As is understood by a person of ordinary skill in the art, the controller 38 is configured for outputting a driving control signal to the drive system 19 and for outputting a motor signal to control an operation of the motor 32 via selectively energizing coils (of the stator) of a plurality of phases of the motor 32. In one embodiment, the controller 38 may include the control unit and/or features of the control unit as disclosed in U.S. Pat. No. 10,693,344 ("the '344 Patent"), which is commonly assigned and is incorporated by reference herein in its entirety.

The controller 38 is configured to move the flywheel 34 into engagement with the driver 26 at a start of a drive commencement such that energy is transferred from the flywheel 34 to the driver 26 for driving the fastener in the drive channel DC into the workpiece. The controller 38 may receive signals from one or more sensors S indicative of characteristics of at least one of the flywheel 34 and motor 32. Based on the received signals from the one or more sensors S, the controller 38 is configured to adjust a speed of the driver 26 based on 1) a difference between a first angular velocity of the flywheel 34 measured by the one or more sensors S at or before the start of the drive commencement and a second angular velocity measured by the one or more sensors S after the start of the drive commencement; or 2) a time difference between a first time after the start of the drive commencement when the driver 26 and the flywheel 34 are in engagement with each other and when the driver 26 and the flywheel 34 are moving at the same speed and a second time when the characteristic of the motor 32 meets a predetermined threshold. In one embodiment, the predetermined threshold is a second flywheel angular jerk predetermined threshold, as will be described in detail below. In another embodiment, the predetermined threshold is a second angular acceleration predetermined threshold, as will be described in detail below.

The controller 38 may be configured to control a supply of power from the power source 25 to the motor 32 to initiate a drive cycle/sequence/stroke. The drive cycle/sequence/stroke may include a time from which the driver 26 is activated to engage and drive the fastener in the drive channel DC into the workpiece to a time until the driver 26 is retracted along the drive axis 29 to clear the drive channel DC and to allow for feeding of a subsequent fastener into the drive channel DC. The controller 38 may receive signals whether the fastener tool 10 is in the sequential activation mode or in the bump/contact activation mode.

This patent application provides a firmware algorithm for adjusting a driver velocity/speed of the flywheel nailer 10 based on the time variation of flywheel angular velocity as shown in FIG. 7. The velocity and the speed of the driver 26 may be interchangeably used. The flywheel speed of a subsequent drive may be determined by a lookup table with lookup value consisting of the output of one of calculations or a combination thereof.

In a first exemplary method/procedure, the output of one of two calculations may include a difference measurement between angular velocity measured at two points in time that characterize the time the nail/fastener is being actively driven into the workpiece. That is, in the first exemplary method, a firmware algorithm for adjusting flywheel nailer driver velocity based on the time variation of flywheel angular velocity. The adjusted flywheel/motor speed may come from any one of (1) a calculation, wherein the next speed has an upper limit and a lower limit, or (2) a feedback loop, or (3) a lookup value in a lookup table in which the lookup value is defined by two points in time after initiation of a drive event. The flywheel speed of a subsequent drive maybe determined by a lookup table with lookup value consisting of the output of one of calculations or a combination thereof.

By calculating the difference between angular velocity measured at any combination of two of the following: [A] at a set point in time after initiating the drive event; [B] at a dynamic point in time after initiation of the drive event, determined by a threshold of flywheel angular acceleration; and [C] at a dynamic point in time after initiation of the drive event, determined by a threshold of flywheel angular jerk. As an example, the lookup value may be one of a set of angular velocities e.g., (A and B) or a combination thereof. For example, a difference in the angular velocities may be calculated between 1) initial angular velocity A/B and final angular velocity B/A, 2) initial angular velocity B/C and final angular velocity C/B, or 3) initial angular velocity A/C and final angular velocity C/A.

That is, in one embodiment, the controller 38 is configured to adjust a speed of the driver 26 based on a difference between a first angular velocity of the flywheel 34 measured by the one or more sensors S at or before the start of the drive commencement and a second angular velocity measured by the one or more sensors S after the start of the drive commencement. The first angular velocity may include a set measurement point in time at or before the start of the drive commencement. The second angular velocity may include one or more of the following: (a) a first dynamic measurement point in time that is after the start of the drive commencement, wherein the first dynamic measurement point is determined when an angular acceleration of the flywheel meets an angular acceleration predetermined threshold; or (b) a second dynamic measurement point in time that is after the start of the drive commencement, wherein the second dynamic measurement point is determined when an angular jerk of the flywheel meets a flywheel angular jerk predetermined threshold.

FIG. 7 shows a graphical representation in which the controller 38 is configured to adjust a speed of the driver 26 based on a difference between two angular velocities of the flywheel 34. The speed of the motor 32 (in RPM) is shown on the X-axis and the time (in seconds) is shown in the Y-axis in FIG. 7. FIG. 7 also shows profile velocities (A and B) and surface velocities (i.e., C, D. and E) of the flywheel 34. FIG. 7 shows long nail drive case LND and no nail drive case (i.e., dry fire scenario) NND. FIG. 7 also shows times $T_{START}$, $T_{MESH/HOOK\_UP}$, and $T_{END/FINISH}$. $T_{FINISH}$ may be interchangeably referred to as $T_{END}$. $T_{MESH}$ may be interchangeably referred to as $T_{HOOK\_UP}$. The time $T_{START}$ refers to the time when at least one of the motor 32 and the flywheel 34 engage and begin to transfer energy. The time $T_{MESH/HOOK\_UP}$ refers to the time when the surface of the flywheel 34 and the driver 26 reach equal velocity. The time $T_{END/FINISH}$ refers to the time when the flywheel 34 and the driver 26 disengage from each other.

Delta $D_{LND}$ is calculated in the long nail drive case by calculating/determining a difference between the angular velocity of the flywheel 34 at or before the start of the drive commencement (or $T_{MESH}$ Or $T_{HOOK\_UP}$) and the angular velocity of the flywheel 34 after the start of drive commencement (or $T_{END}$ Or $T_{FINISH}$). The $T_{END}$ Or $T_{FINISH}$ may be determined when the characteristic of the flywheel 34 meets a predetermined threshold of flywheel angular acceleration or when the characteristic of the flywheel 34 meets a predetermined threshold of flywheel angular jerk.

Similarly, Delta NND is calculated. Delta $D_{NND}$ is calculated in the no nail drive case by calculating/determining a difference between the angular velocity of the flywheel 34 at or before the start of the drive commencement (or $T_{MESH}$ Or $T_{HOOK\_UP}$) and the angular velocity of the flywheel 34 after the start of drive commencement (or $T_{END}$ or $T_{FINISH}$). The $T_{END}$ Or $T_{FINISH}$ may be determined when the characteristic of the flywheel 34 meets a predetermined threshold of flywheel angular acceleration or when the characteristic of the flywheel 34 meets a predetermined threshold of flywheel angular jerk.

The deceleration of the motor 32 during the drive may generally vary, among other things, with at least one of a length of the nail/fastener and a type of joint in the workpiece(s). The speed of the flywheel 34 may be reduced by two factors: [a] an initial friction to start profile moving (that is, between $T_{START}$ to $T_{MESH}$), and [b] resistance of the nail/fastener and/or the workpiece (that is, between the $T_{MESH}$ and $T_{FINISH}$). By measuring from $T_{START}$ to $T_{FINISH}$ of the drive event may neglect variation in the factor [a] above. Instead of taking measurement from $T_{START}$ to $T_{FINISH}$, it is more accurate to measure from estimated flywheel/profile hook-up point (that is, from $T_{MESH}$) to $T_{FINISH}$. The measurement from estimated flywheel/profile hook-up point may not be significantly affected by a variation in factor [a] above and may also provide better correlation to the factor [b] above and to the actual energy output required to drive the nail/fastener.

In a second exemplary method/procedure, the firmware algorithm for adjusting a driver speed of the flywheel nailer 10 may be based on a difference measurement in time between two characteristics of flywheel angular speed, acceleration, or jerk selected to characterize the time the nail/fastener is being actively driven into the workpiece.

In the second exemplary method, the controller 38 is configured to control a nail gun drive speed by measuring a time difference between an initial/a first time when the driver 26 and the flywheel 34/motor 32 are engaged/meshed together and moving at the same speed, and a final time when the driver 26 and the flywheel 34/motor 32 are disengaged. This time difference may be a driving time and may be based on the length of a nail/fastener being driven. As such, the longer the nail/fastener, the longer the driving time. That is, the controller 38 may include a software/algorithm configured for controlling a nail gun drive speed by measuring this time difference. Once the driving time is calculated, the algorithm/software/controller is configured to use the driving time to adjust the flywheel/motor speed for the next fastener being driven. The adjusted flywheel/motor speed can come from any one of (1) a calculation, wherein the next speed has an upper limit and a lower limit, or (2) a feedback loop, or (3) a lookup value in a lookup table in which the lookup value is defined by two points in time after initiation of a drive event. As an example, the lookup value may be one of a set of times e.g., (I-1 and F-1) or a combination thereof.

For example, the initial time may include [I-1]: a set point in time after the initiation of the drive event, estimated to correspond with the time the driver and flywheel surface velocities converge to the same value; [I-2]: a dynamic point in time after initiation of the drive event, determined by a threshold of flywheel angular acceleration; and [I-3]: a dynamic point in time after initiation of the drive event, determined by a threshold of flywheel angular jerk. For example, the final time may include [F-1]: a set point in time after initiation of the drive event, determined by a threshold of flywheel angular velocity; [F-2]: a dynamic point in time after initiation of the drive event, determined by a threshold of flywheel angular velocity determined by a function with dependent variables including the velocity measured at the initial time; [F-3]: a set point in time after initiation of the drive event, determined by a threshold of flywheel angular acceleration; and [F-4]: a dynamic point in time after initiation of the drive event, determined by a threshold of flywheel angular jerk.

The time difference may be calculated between any combination of initial time and final time described below. For example, the time difference may be calculated between 1) initial time [I-1] and final time [F-1], 2) initial time [I-1] and final time [F-2], 3) initial time [I-1] and final time [F-3], 4) initial time [I-1] and final time [F-4], 5) initial time [I-2] and final time [F-1], 6) initial time [I-2] and final time [F-2], 7) initial time [I-2] and final time [F-3], 8) initial time [I-2] and final time [F-4], 9) initial time [I-3] and final time [F-1], 10) initial time [I-3] and final time [F-2], or 11) initial time [I-3] and final time [F-3].

| Initial time | Final Time | Time Difference |
|---|---|---|
| [I-1]: a set point in time after the initiation of the drive event, estimated to correspond with the time the driver and flywheel surface velocities converge to the same value | [F-1]: a set point in time after initiation of the drive event, determined by a threshold of flywheel angular velocity | Initial time [I-1] and final time [F-1] |
| [I-2]: a dynamic point in time after initiation of the drive event, determined by a threshold of flywheel angular acceleration | [F-2]: a dynamic point in time after initiation of the drive event, determined by a threshold of flywheel angular velocity determined by a function with dependent variables including the velocity measured at the initial time | Initial time [I-1] and final time [F-2] |
| [I-3]: a dynamic point in time after initiation of the drive event, determined by a threshold of flywheel angular jerk | [F-3]: a set point in time after initiation of the drive event, determined by a threshold of flywheel angular acceleration | Initial time [I-1] and final time [F-3] |
| | [F-4]: a dynamic point in time after initiation of the drive event, determined by a threshold of flywheel angular jerk | Initial time [I-1] and final time [F-4] |
| | | Initial time [I-2] and final time [F-1] |
| | | Initial time [I-2] and final time [F-2] |
| | | Initial time [I-2] and final time [F-3] |
| | | Initial time [I-2] and final time [F-4] |
| | | Initial time [I-3] and final time [F-1] |

-continued

| Initial time | Final Time | Time Difference |
|---|---|---|
| | | Initial time [I-3] and final time [F-2] |
| | | Initial time [I-3] and final time [F-3] |

That is, in one embodiment, the controller 38 is configured to adjust a speed of the driver 26 based on a time difference between a first time after the start of the drive commencement when the driver and the flywheel are in engagement with each other and when the driver and the flywheel are moving at the same speed and a second time when the characteristic of the motor meets a predetermined threshold. The first time may be interchangeably referred to as an initial time, and the second time may be interchangeably referred to as the final time. In one embodiment, the first time may include one of the following: (1) a first time set measurement that is determined when the driver and the flywheel are in engagement with each other and when the driver and the flywheel are moving at the same speed; (2) a first time, first dynamic measurement that is determined when an angular acceleration of the flywheel meets a first angular acceleration predetermined threshold; or (3) a first time, second dynamic measurement that is determined when an angular jerk of the flywheel meets a first flywheel angular jerk predetermined threshold. In one embodiment, the second time may include one of the following: (1) a second time, first set measurement that is determined when an angular velocity of the flywheel meets a first angular velocity predetermined threshold; (2) a second time, first dynamic measurement that is determined when the angular velocity of the flywheel meets a second angular velocity predetermined threshold, wherein the second angular velocity predetermined threshold includes a function with dependent variables including a first time angular velocity of the flywheel that is measured at the first time; (3) a second time, second set measurement that is determined when the angular acceleration of the flywheel meets a second angular acceleration predetermined threshold; or (4) a second time, second dynamic measurement that is determined when the angular jerk of the flywheel meets a second flywheel angular jerk predetermined threshold.

In one embodiment, the predetermined threshold for determining the final time of the time difference may be the second flywheel angular jerk predetermined threshold. In one embodiment, the predetermined threshold for determining the final time of the time difference may be the second angular acceleration predetermined threshold.

In one embodiment, the first flywheel angular jerk predetermined threshold may be different from the second flywheel angular jerk predetermined threshold. In one embodiment, the first flywheel angular jerk predetermined threshold may be the same as the second flywheel angular jerk predetermined threshold.

In one embodiment, the first flywheel angular acceleration predetermined threshold may be different from the second flywheel angular acceleration predetermined threshold. In one embodiment, the first flywheel angular acceleration predetermined threshold may be the same as the second flywheel angular acceleration predetermined threshold.

FIG. 8 shows a graphical representation in which the controller 38 is configured to adjust a speed of the driver 26 based on the time difference between the first time after the start of the drive commencement when the driver and the flywheel are in engagement with each other and when the driver and the flywheel are moving at the same speed and the second time when the characteristic of the motor meets a predetermined threshold. The predetermined threshold may be the second flywheel angular jerk predetermined threshold or the second angular acceleration predetermined threshold.

The speed of the motor 32 (in RPM) is shown on the Y-axis and the time (in seconds) is shown in the X-axis in FIG. 8. FIG. 8 also shows profile velocities (A and B) and surface velocities (i.e., C, D. and E) of the flywheel 34. FIG. 8 shows long nail drive case LND and no nail drive case (i.e., dry fire scenario) NND. FIG. 8 also shows times $T_{START}$, $T_{MESH/HOOK\_UP}$, and $T_{END/FINISH}$. The time $T_{START}$ refers to the time when the flywheel 34 and the driver 25 engage. The time $T_{MESH/HOOK\_UP}$ refers to the time when the surface of flywheel 34 and the driver 26 reach equal velocity. The time $T_{END/FINISH}$ refers to the time when the motor speed drops to the threshold value.

Delta $D_T$ is calculated by calculating/determining a difference between $T_{END}$ Or $T_{FINISH}$ in the long nail drive case and $T'_{END}$ or $T'_{FINISH}$ in the no nail drive case. The time between the driver 26/flywheel 34 'mesh' or 'hook-up' ($T_{MESH}$) and either beginning or end of drive ($T_{FINISH}$) may be correlated to the length of the nail/fastener being driven. For example, the time between the driver 26/flywheel 34 'mesh' or 'hook-up' ($T_{MESH}$) and the end of drive ($T_{FINISH}$) for the long nail drive case is less than the time between the driver 26/flywheel 34 'mesh' or 'hook-up' ($T_{MESH}$) and the end of drive (T'FINISH) for the no nail drive case. The time may also be influenced by the depth adjust setting of the fastener tool 10. That is, there is more space between the nail/fastener and the workpiece, the more time to travel. Time may be influenced by the density of the material. In one embodiment, sensing the bumper impact may inform/help determine the depth adjust setting of the fastener tool 10. In one embodiment, sensing the motor disengagement from PTO (pinch roller) may inform/help determine the depth adjust setting of the fastener tool 10. Current is applied to motor 32 throughout drive event. In one embodiment, $T_{FINISH}$ and $T'_{FINISH}$ may be defined by the end of deceleration of the flywheel 34.

FIG. 9 shows a graphical representation in which the controller 38 is configured to determine/distinguish different (e.g., lengths of the) nails based on the sensed motor speed signals. That is, the controller 38 may be configured to receive motor speed signals (from the one or more sensors S) and process these motor speed signals to determine/distinguish different nails.

The speed of the motor 32 (in RPM) is shown on the X-axis and the time (in seconds) is shown in the Y-axis in FIG. 9. FIG. 9 also shows profile velocities (A and B) and surface velocities (i.e., C, D. and E) of the flywheel 34. FIG. 9 shows three different nail lengths cases-a long length nail, a medium length nail and a short length nail. FIG. 9 also shows times $T_{MESH/HOOK\_UP}$, and $T_{END/FINISH}$ for each of these three different nail lengths cases. The time $T_{MESH/HOOK\_UP}$ refers to the time when the flywheel 34 and the driver 26 engage with each other to transfer energy from the flywheel 34 to the driver 26 for driving the fastener in the drive channel DC into the workpiece. The time $T_{END/FINISH}$ refers to the time when the flywheel 34 and the driver 26 disengage from each other.

$T_{FINISH}$ for the short length nail is shown as $T_{FINISH\_SLN}$. $T_{FINISH}$ for the medium length nail is shown as $T_{FINISH\_MLN}$. $T_{FINISH}$ for the long length nail is shown as $T_{FINISH\_LLN}$. As can be clearly seen from FIG. 9, the short length nail completes its drive cycle (e.g., see $T_{FINISH\_SLN}$) before the drive cycle of the medium length nail (e.g., see $T_{FINISH\_MLN}$), which in turn is completed before the drive cycle of the long length nail (e.g., see $T_{FINISH\_LLN}$).

The controller 38 may be configured to adjust the speed of the driver 26 to varying characteristics of the fastener. The varying characteristics of the fastener may include one or more of the following: a length of the fastener, a material of the fastener, or a thickness of the fastener.

The controller 38 may be configured to receive flywheel speed curve signals (from the one or more sensors S) and process these signals for different applications. Some exemplary sensors (and signals therefrom) may include hall effect sensor and sense magnet fixed to the flywheel, back-EMF from motor coil/phase wires, variable reluctance sensor, optical sensor, etc.

The controller 38 may be configured to adjust the speed of the driver 26 to varying characteristics of the workpiece. The varying characteristics of the workpiece may include one or more of the following: a thickness of the workpiece, a positioning of the workpiece with respect to the fastener tool 10, a material of the workpiece, a density of the workpiece, or a type of a joint in the workpiece.

The fastener tool 10 may further comprise a depth adjustment assembly that is configured to enable a user to perform at least one of the following: select a depth adjustment setting to adjust a depth at which the fastener tool 10 drives the fastener into the workpiece and adjust a penetration depth of the fastener into the workpiece. Further details of the depth adjustment assembly of the fastener tool 10 are provided in commonly assigned U.S. Pat. No. 7,213,732 ("the '732 Patent"), which is commonly assigned and are incorporated by reference in their entirety. The controller 38 may be configured to adjust the speed of the driver to varying user adjustable depth adjustment settings of the depth adjustment assembly.

In one embodiment, the controller 38 is configured to continuously run (i.e., run all the time) the above discussed algorithm(s) to adjust a speed of the driver based on at least one of the difference of angular velocities of the flywheel 34 and the difference in time as discussed in detail above, that is, without any user's indication or input.

In one embodiment, the controller 38 is configured to run the above discussed algorithms based on user's input or indication. The fastener tool 10 may include a mode button to enable/disable the feature (i.e., adjust a speed of the driver based on at least one of the difference of angular velocities of the flywheel 34 and the difference in time as discussed in detail in the present patent application). In one embodiment, the mode button may be any type of user engageable portion disposed on the housing 16, for example, including user engageable display, user engageable touch screen, user engageable touch sensor, user engageable control knob, user engageable control button, and other user engageable control device. For example, a long press of the user engageable portion may be configured to start calibration sequence. In one embodiment, the fastener tool 10 may also include an indication (e.g., indication light), disposed on the housing 16, for the user for current speed selected. In one embodiment, the fastener tool 10 may include a bluetooth setting (or other forms of wireless settings) that is configured to scan a QR code on the nail/fastener to automatically adjust power to the driver 26 of the fastener tool 10. In other embodiments, instead of a QR code, machine readable identification may include another form of identification that is machine readable (e.g., is optically scannable), such as a bar code.

The fastener tool 10 may include the magazine 14, which may be coupled to the housing 16. The magazine may be interchangeably referred to as magazine assembly. The magazine 14 may be coupled to the nose assembly 18 and disposed in the housing 16. The magazine 14 is configured to carry a supply of fasteners through a feed channel along a feed channel direction toward the nose assembly 18. The feeder 110 may be operatively connected with the magazine and may be configured to feed the fastener through the magazine 14 and into the drive channel DC prior to driving the fastener into the workpiece.

The magazine 14 is an elongated receptacle that extends away from the nose assembly 18, towards a back end of the handle 226. The magazine 14 may be provided such that it extends between the nosepiece 18 and a base portion of the fastener tool 10 (e.g., near a removable battery pack 22 as shown in FIG. 1). The magazine 14 may be positioned an acute angle relative to the handle 226 and extending between the nose assembly 18 and a bottom portion of the handle 226, such that a bottom portion of the magazine 14 may be positioned at an acute angle relative to a workpiece when the nose assembly 18 is positioned and is configured for applying the fastener thereto.

The magazine 14 may be configured to hold a plurality of fasteners or nails and sequentially feed the fasteners into the nose assembly 18. These fasteners or nails are then configured to be dispensed from the fastener tool 10 with sufficient energy to penetrate the workpiece. The magazine 14 may be configured to hold collated nails. The magazine 14 may include a canister 200 (as shown in FIG. 1) that is configured to hold coiled, collated nails/fasteners. The magazine 14 (via its parts therein) may generally be configured to sequentially feed/present a lead fastener of the plurality of fasteners into the drive channel DC of the fastener tool 10. The magazine 14 may include the feeder 110. The magazine 14 may be opened to load collated fasteners into the magazine 14 as described in detail in the incorporated '521 Patent. The further details of the magazine 14 are provided in the incorporated '521 Patent and the incorporated '323 Patent.

The trigger 20 may be adjacent to or on the handle 226 and may be connected to the controller 38 (also interchangeably referred to as a control unit or a power control module). The trigger 20 may be provided in the form of a button for manual operation such that when an operator/a user grips the handle 226, the trigger 20 may be engaged by a forefinger of the operator/user. The trigger 20 is mechanically coupled to the handle 226 and is electrically coupled to at least the motor 32 and controller 38 such that electric power may be selectively provided thereto. The trigger 20 may be a push button that moves back and forth, or a button that may be pivotally mounted to the housing 16 by way of a pivot, such that application of force via the operator's forefinger moves the trigger 20 relative to the handle 226. The trigger 20 may be associated with a trigger switch/sensor TS. The trigger 20 may also be associated with the contact trip assembly 21 and the controller 38.

The contact trip assembly 21 is configured to prevent accidental activation of the fastener tool 10. Generally, an operator of the fastener tool 10 may hold or grip the fastener tool 10 by providing their hand around the handle 226 and place the nose assembly 18 at a desired location for applying the fastener, push down on the contact trip assembly 21, and depress the trigger 20 in order to activate the controller 38 and the internal actuators (as will be described in detail later) and to cause the fastener to be ejected at that desired location. In one embodiment, the contact trip assembly 21 may be provided on the nose assembly 18. The contact trip assembly 21 may be coupled to the nose assembly 18 for sliding movement thereon. In operation, the contact trip assembly 21 must first be deactivated in order to propel the driver 26 and drive the fastener into the workpiece.

Other operation restricting devices (e.g., mechanical and/or electrical, like switches) may also be provided in the fastener tool 10. The contact trip assembly 21 may include a contact trip (or contact trip member) actuatable to initiate the drive stroke. The contact trip may be positioned in front of the driver 26 in the housing 16 of the fastener tool 10. The contact trip is configured for movement relative to the housing 16 parallel to the movement of the driver 26. Also, provided are a contact trip spring and a contact trip switch CTS. The contact trip switch CTS is configured such that the contact trip switch CTS may be tripped or actuated (e.g., closed) to allow use of the fastener tool 10 (when all conditions are met for driving or firing), and may also be electrically coupled to the controller 38. The contact trip switch CTS may be provided in a normally open position and closed when the contact trip spring is compressed by force upon the contact trip itself, for example. In one embodiment, as an operator applies force or bias on the fastener tool 10, i.e., towards a workpiece, a contact surface of the contact trip assembly 21 engages the workpiece and then actuates movement of the body of the contact trip relative to the drive channel DC, thereby closing the contact trip switch CTS and spring-loading or compressing the contact trip spring that normally biases the contact trip assembly 21 relatively forward such that the fastener tool 10 is disabled from firing.

When the trigger 20 is actuated by the operator's forefinger (e.g., the trigger switch TS is closed) and all other conditions for firing are met, the drive system 19 and thus the motor 32 may be initiated i.e., activated or energized, to fire a fastener. Such features are known by a person of ordinary skill in the art and thus not further described here. That is, the trigger switch TS may be configured to generate a trigger signal that may be employed in whole or in part to initiate the cycling of the fastener tool 10 to install a fastener to a workpiece.

The contact trip assembly 21 may be configured to slide rearwardly in response to contact with a workpiece and may interact with either the trigger 20 or the contact trip sensor/switch CTS. When the contact trip assembly 21 interacts with the trigger 20, the contact trip assembly 21 cooperates with the trigger 20 to permit the trigger 20 to actuate the trigger switch TS to generate the trigger signal. More specifically, the trigger 20 may include a primary trigger, which is actuated by a finger of the user, and a secondary trigger, which is actuated by sufficient rearward movement of the contact trip assembly 21. Actuation of either one of the primary and secondary triggers will not, in and of itself, cause the trigger switch 20 to generate the trigger signal. Rather, both the primary and the secondary trigger must be placed in an actuated condition to cause the trigger 20 to generate the trigger signal. When the contact trip assembly 21 interacts with the contact trip sensor/switch CTS, rearward movement of the contact trip assembly 21 by a sufficient amount causes the contact trip sensor/switch CTS to generate a contact trip signal, which may be employed in conjunction with the trigger signal to initiate the cycling of the fastener tool 10 to install a fastener to a workpiece.

The feeder 110 may be configured to feed the fastener into the drive channel DC of the nose assembly 18 prior to the driver 26 driving the fastener into the workpiece. The feeder 110 may include a start time defining a time at which the feeder 110 is activated to feed the subsequent fastener into the drive channel DC. That is, the feeding cycle may include the activation of the feeder/feed solenoid and feeding of the next/subsequent nail into the drive path or drive channel DC.

The feeder 110, shown in FIG. 1, may include a feed pawl assembly (not shown) and a follower pawl assembly (not shown). The feed assembly 110 is operatively associated with the magazine 14 and is configured to advance the fasteners contained therein in a feed direction (i.e., towards the drive channel DC, the nose assembly 18 and the driver 26) to present a lead fastener into the nose assembly 18. The feed assembly 110 has the feed actuator 148 that is configured to move the lead fastener into the nose assembly 18. A coil or a set of the collated fasteners may be inserted into the canister 200 and an end of the collated fasteners with a lead fastener may be strung towards the drive channel DC such that one of the collated fasteners is positioned in the feed assembly 110 for feeding (e.g., using teeth and/or a pawl assembly, and the feed actuator 148).

The feed assembly 110 may include a biasing spring and a feed rod configured to move the lead fastener (from the set of collated fasteners contained in the canister 200) into the nose assembly 18. The biasing spring may bias the feed rod into a first position, and the feed actuator 148 may be configured to move (i.e., reciprocate) the feed rod to a second position, against a biasing force of the biasing spring, for moving the lead fastener into the nose assembly 18. The features of the feed assembly 110 may include those of the incorporated '521 Patent or the incorporated '323 Patent.

The fastener tool 10 may include two actuators-one actuator 36 for driving a fastener, another actuator 148 for feeding the fastener, one or both of the actuators which are controlled by the controller 38, along with the motor 32, in order to drive and load fasteners in succession and, in some cases, ready the fastener tool 10 such that shot-to-shot time of fasteners is increased. In one embodiment, the feed actuator 148 may be optional.

The actuator 36 may be operatively connected to the controller 38. The actuator 36 may be configured to move the driver 26 into engagement with the flywheel 34 such that energy is transferred from the flywheel 34 to the driver 26 and to disengage the flywheel 34 from the driver 36 (e.g., after the drive cycle/sequence/stroke). The actuator 36 is a drive actuator. The drive actuator includes a drive solenoid 92. The drive actuator 36 may be an electro-mechanical actuator such as a linear actuator.

Figure 4:
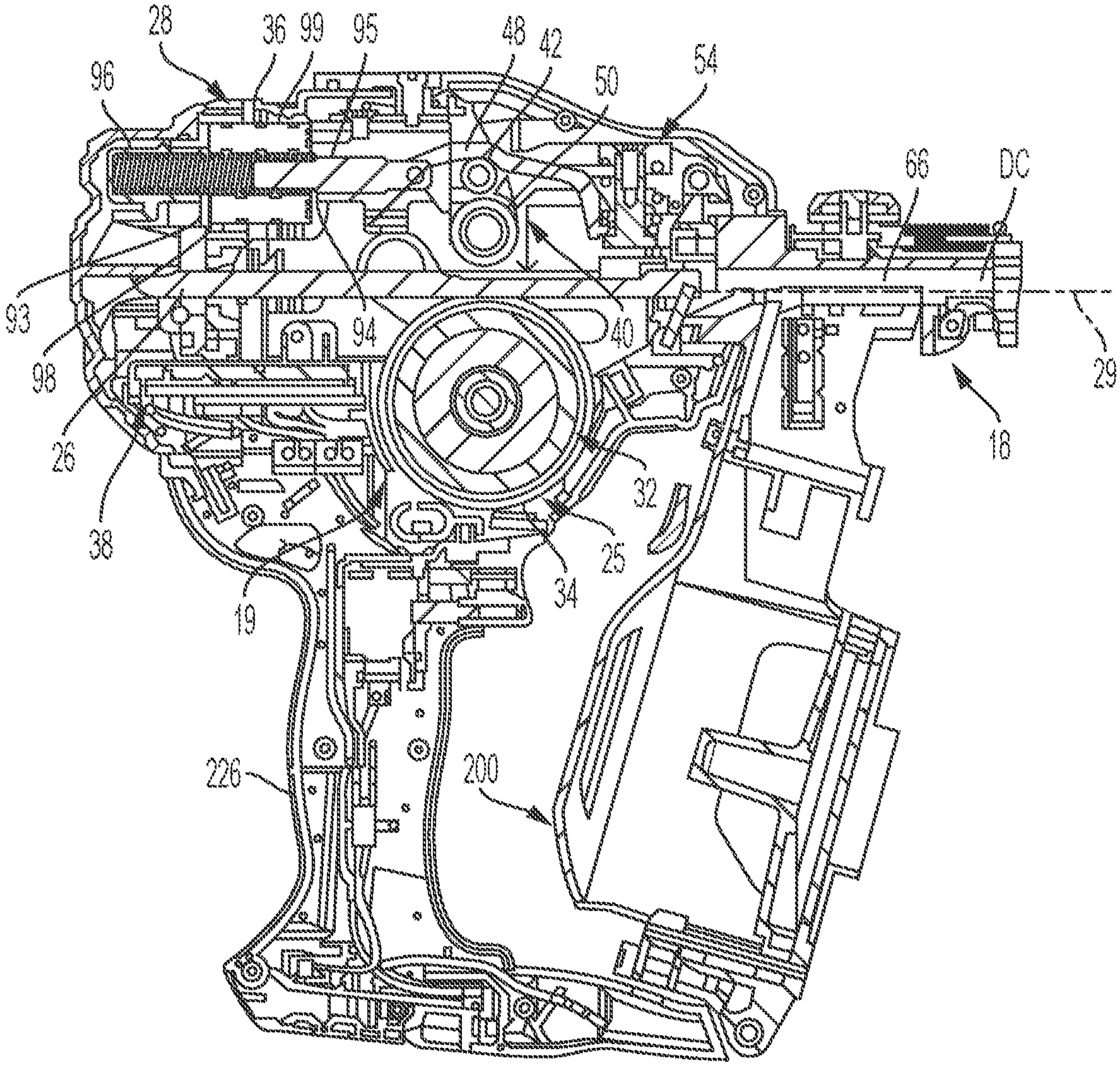
FIG. 4 is a cross-sectional view along line A-A of the tool in FIG. 3 showing features of a drive actuator and a drive system in accordance with an embodiment of the present patent application.

The drive actuator 36 is the solenoid 92 that includes a body 93, a plunger 94 in the form of a shaft which is movable relative to the body 93 along an actuation axis 95, and a plunger spring 96 that biases the plunger 94 into an extended position. While the plunger spring 96 is illustrated in FIG. 4 as being received in the body 93, it will be appreciated by a person of ordinary skill in the art that, in the alternative, the plunger spring 96 can be received about the plunger 94 between a feature on the plunger 94 and the plunger body 93 or between a feature on the plunger 94 and another part adjacent the body 93. The body 93 may include a housing 98 and a coil assembly 99 therein that can be electrically coupled to the control unit 38. The body 93 may be fixedly coupled to the carriage 44 in a snap-fit manner, in accordance with an embodiment. The housing 98 may be sized to engage the arm members 56 such that abutment of the housing 98 against the arm members 56 limits movement of the body 93 relative to the arm members 56 when the coil assembly 99 is energized and the plunger 94 is being drawn into the body 93. The plunger 94 may include a through-hole for receipt of a pin 100 which is used to pivotally couple the follower arm 48 and the plunger 94. Accordingly, the actuator slots 58 (shown in FIG. 5), which may be disposed generally parallel to the actuation axis 95, may guide and support the end of the plunger 94 to which the follower arm 48 is coupled. Other/additional details about the drive actuator 36 may be found in the incorporated '323 Patent.

The controller 38 may be operatively connected to the feed actuator 148 and that feeder 110. The controller 38 may be configured to implement a firing sequence for driving a lead fastener into the workpiece using the driver 26 and for feeding the lead fastener into the nose assembly 18 using the feeder 110. The feed actuator 148 may include a feed solenoid 150. The feed actuator 148 may be configured to move the lead fastener into the nose assembly 18. The firing sequence may include a first electric pulse to the drive actuator 36 and a second electric pulse to the feed actuator 148.

Figure 2:
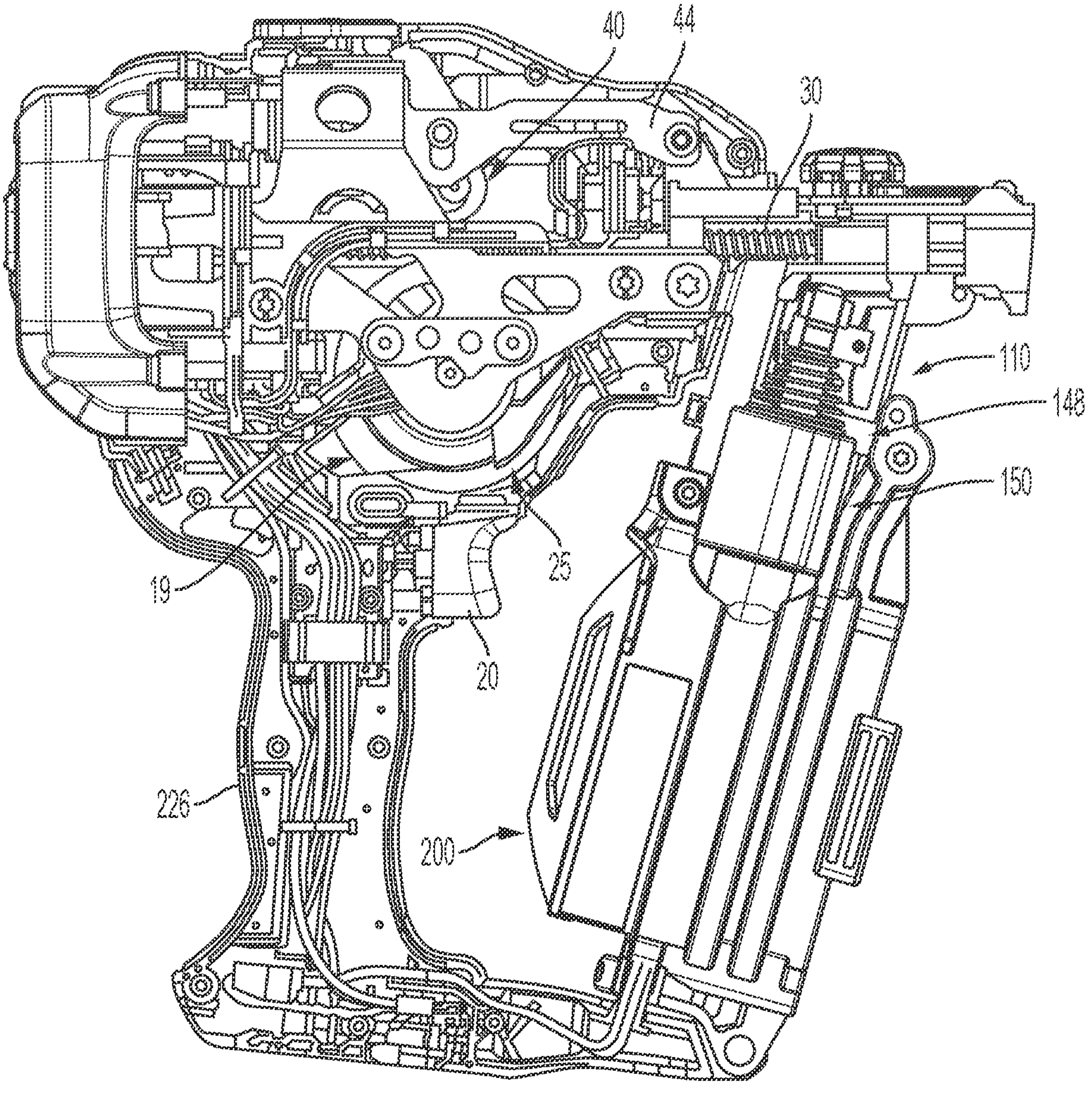
FIG. 2 shows a side view of the fastener tool of FIG. 1, with some portions of a housing of the fastener tool removed to better illustrate other portions of the housing therein.
Figure 3:
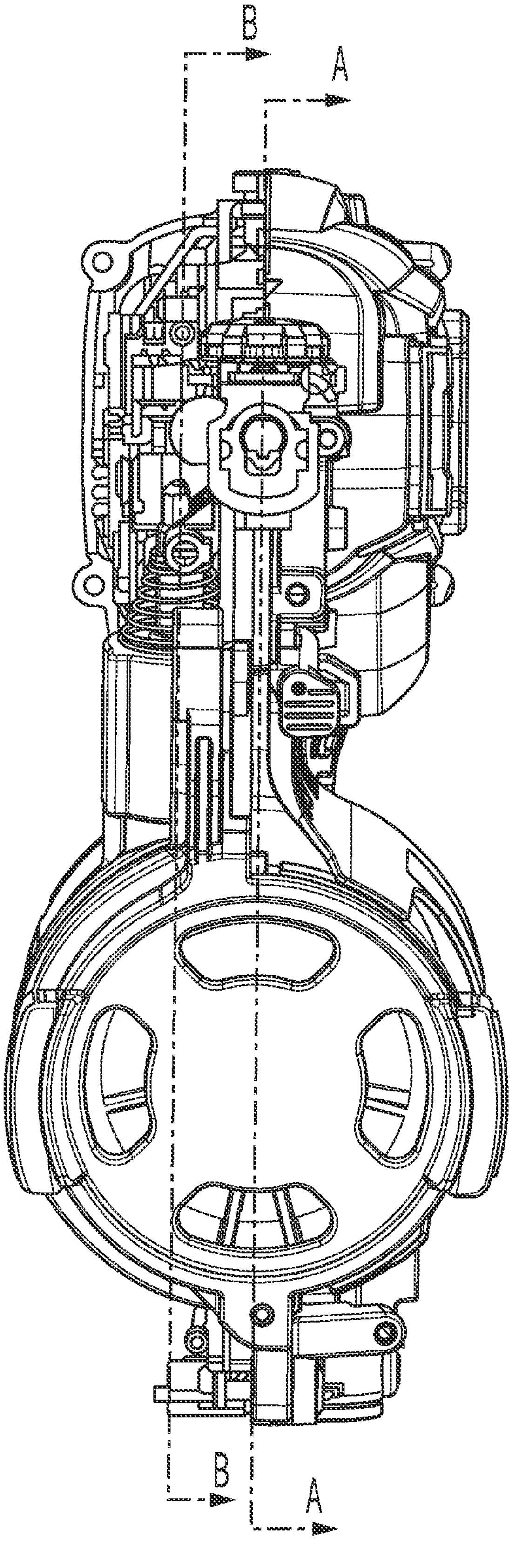
FIG. 3 illustrates a front elevation view of the tool as shown in FIGS. 1 and 2.
Figure 5:
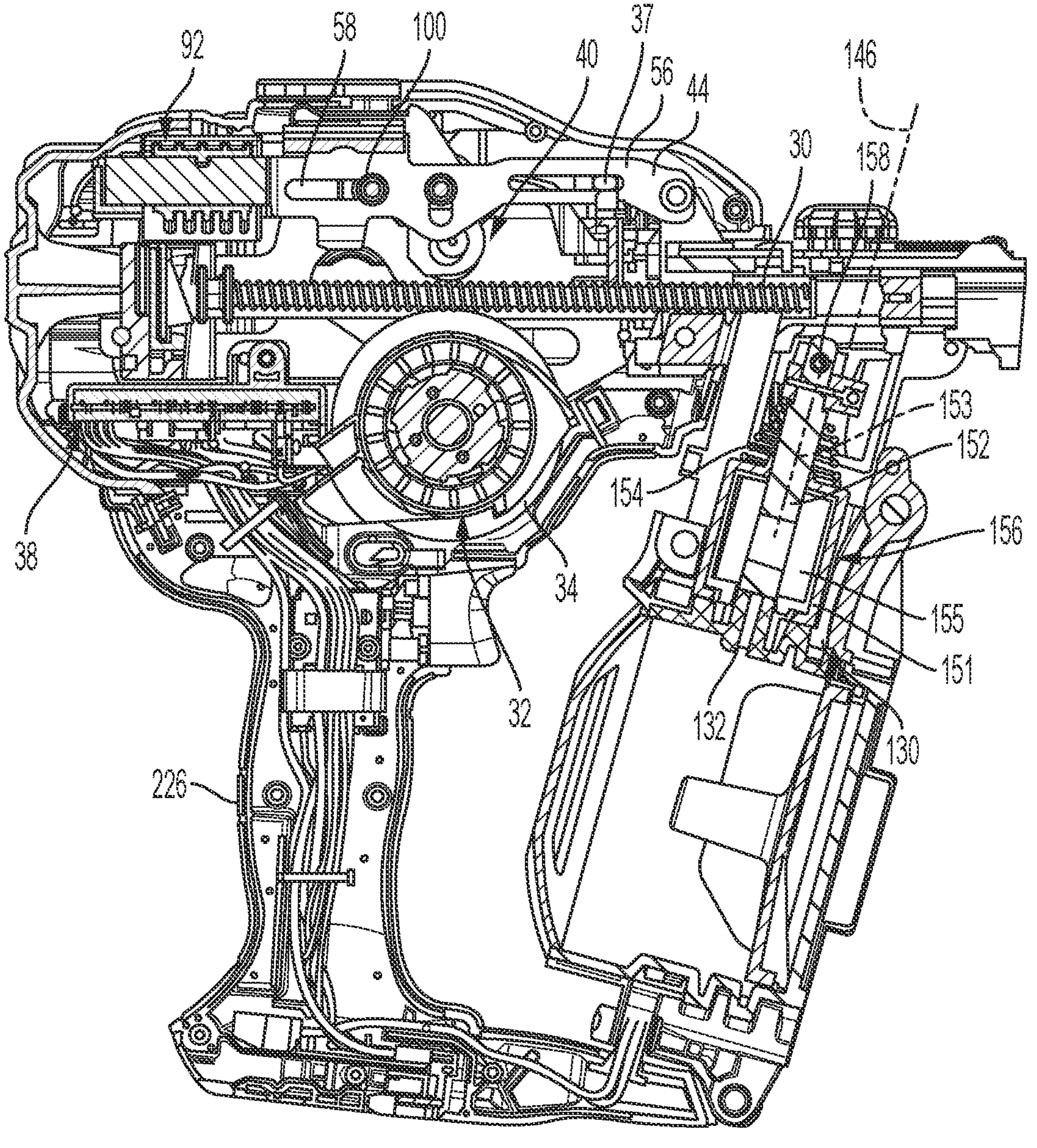
FIG. 5 is a cross-sectional view along line B-B of the tool in FIG. 3 showing features of a feed actuator and a feed system in accordance with an embodiment of the present patent application.
Figure 6:
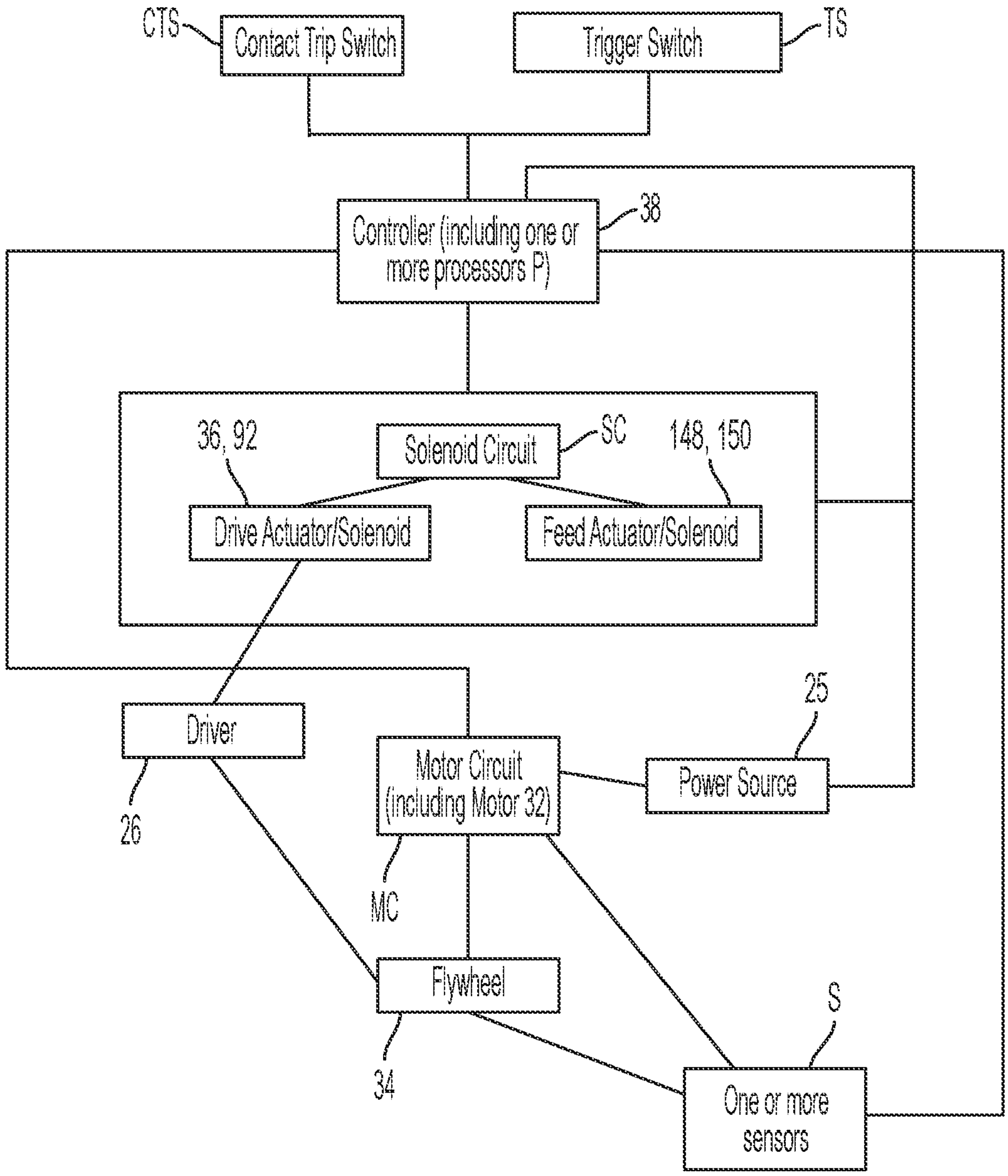
FIG. 6 illustrates a schematic representation showing electrical and/or operative connections between controller, power source, one or more sensors, and drive and feed actuators, as well as some of switches, flywheel, driver and motor included in the fastener tool in accordance with an embodiment of the present patent application.

Like the drive actuator 36, the feed actuator 148 may be an electro-mechanical actuator such as a linear actuator. The feed actuator 148 may be an electrical actuator. The feed actuator 148 may be in the form of a feed solenoid 150, in accordance with an embodiment. Referring to FIGS. 2 and 5, the feed actuator 148 may be in the form of the solenoid 150, in accordance with an embodiment, that includes a body 151, a plunger 152 in the form of a shaft which is movable relative to the body 151 along an actuation axis 153, and a plunger spring 154 that biases the plunger 152 into an extended position, e.g., towards the nose assembly 18. While the plunger spring 154 is illustrated as being outside the body 151, it will be appreciated that in the alternative, the plunger spring 154 may be received about the plunger 152 within part of the plunger body 151, for example. The body 151 may include a housing 156 and a coil assembly 155 that can be electrically coupled to the control module 38. The body 151 may be coupled to the feeder 110, below the nose assembly 18 and above the magazine 14/canister 200, in accordance with an embodiment. The plunger 152 may have an abutment structure associated therewith such that the plunger spring 154 extends between a top portion of the housing 156 (or body 151) and the abutment structure. Also, the plunger 152 may include a through-hole 158 at an upper portion thereof, e.g., for receipt of a spring (or portion thereof, see, e.g., FIG. 5), or pin. The housing 156 may be sized such that the plunger 152 is configured to move relatively therein and compress the plunger spring 154 when the coil assembly 155 is energized. In one embodiment, the plunger 152 may be drawn into the body 151. Accordingly, activation of the coil assembly 155 results in movement (e.g., pulling relatively downward) of the shaft of the plunger against the force of spring 154 to allow a nail to be loaded. When the feed actuator 148 is deactivated, the spring 154 biases the shaft of the plunger 154 upward and allows the nail to be loaded into a chamber (or drive channel) that is along the path of the driver 26. Other features of the feed actuator 148 may include those of the incorporated '323 Patent or the incorporated '521 Patent. For example, the feed assembly 110 and feed actuator 148 may be an automatic coil feeder assembly.

In one embodiment, in the fastener tool 10, the drive actuator 36 is positioned on a first axis and the feed actuator 148 is positioned on a second axis. These first and second axes are positioned at a non-perpendicular angle relative to one another. In one embodiment, the first (or actuation) axis is positioned such that the axis is parallel to the drive axis 29. In another embodiment, the second (or actuation) axis is parallel to the feed direction (i.e., the axis extending at an angle from near a bottom of the fastener tool 10 to the nose assembly 18, see axis 146 in FIG. 5). In yet another embodiment, the first axis is positioned such that the axis is parallel to the drive axis 29, and the second axis is parallel to the feed direction. In one embodiment, the drive axis 29 of the drive actuator 36 is provided in a first plane and an axis of the feed actuator 148 defining the feed direction is provided in a second plane, and the first plane is different from the second plane. The axes and planes of the drive actuator 36 and the feed actuator 148 are also shown and described in the incorporated '323 Patent. While the exemplary illustrated embodiments are described as using solenoids (for the drive actuator 36 and the feed actuator 148) as the electro-mechanical actuators, other forms of actuators may be used, for example, an electric motor, a single dual-action solenoid, a multi-stage solenoid, a solenoid in conjunction with a mechanical biasing element, such as a spring, a linear motion machine, or any combination thereof.

In operation, fasteners are stored in the magazine assembly 14, which sequentially feeds the fasteners into the nose assembly 18. The drive motor assembly may be actuated/activated by the controller 38 to cause the driver 26 to translate and impact a fastener (i.e., in the drive channel DC) in the nose assembly 18 so that the lead fastener may be driven into a workpiece. Actuation of the power source 25 may use energy (e.g., electrical energy from the battery pack 22) to operate the motor 32 and the drive actuator 36. The motor 32 is employed to drive the flywheel 34, while the drive actuator 36 is configured to (e.g., move a roller that is associated with a roller assembly 40 that configured to) squeeze the driver 26 into engagement with the flywheel 34 so that energy may be transferred from the flywheel 34 to the driver 26 to cause the driver 26 to translate. The nose assembly 18 (and the drive channel DC) guides the fastener as it is being driven into the workpiece. Actuation of the drive actuator 36 causes the roller assembly 40 to translate toward (e.g., in a generally downward direction) and engage the driver 26 to initiate driving engagement between the driver 26 and the flywheel 34 and thus move the driver 26 into the drive channel DC of the nose assembly 18 that has a lead fastener therein.

After the driver 26 has translated and fired the fastener from the nose assembly 18, the return mechanism 30 may be employed to return the driver 26 to its starting position. The return mechanism 30 biases the driver 26 into a returned/its starting position. For example, the return mechanism 30 may include a biasing member, or spring, which is configured to push (e.g., backwards) the driver 26 back and away from the nose assembly 18 after the driver 26 is deployed to fire a fastener from the fastener tool 10. When the driver 26 has been returned, the solenoid/drive actuator 92 may be deactivated. In one embodiment, the drive actuator, the driver, and the drive system used in the fastener tool 10 may be an electrical actuator, drive, and drive system and are further described in U.S. Pat. No. 9,744,657 ("the '657 Patent"), which is commonly assigned and is incorporated by reference herein in its entirety.

The controller 38 may be configured to activate the solenoid/feed actuator 148. The actual motion of feeding the nails/fastener may be caused by a spring. The spring moves forward and advances the nails/fasteners (e.g., after the solenoid 150 is deenergized). That is, the controller 38 activates/energizes the solenoid, the spring is then pulled down and then the solenoid is deenergized. This pushes the nail/fastener forward. So, it is the combination of the spring and the solenoid that advance the nails/fasteners. When the solenoid 150 is deenergized, the movement (e.g., forward and advancement) of the nails/fasteners start. The time at which the solenoid 150 is energized may be referred to as the feed cycle start time (i.e., for both the sequential and the bump activation modes).

The fastener tool 10 may be an electric fastener tool. The electric power may be supplied, e.g., by a battery pack 22 or from being plugged into a common household AC outlet. In one embodiment, the bottom end of the housing 16 may have a removable and rechargeable energy storage device, which may include the battery pack 22. The battery pack 22 may be configured to engage an end portion of the fastener tool 10 and provide power to the motor 32 within the housing 16, such that the fastener tool 10 may drive one or more fasteners that are fed from the magazine 14 into a workpiece. The location of the battery pack 22 as shown in the Figures is not limiting and is illustrative only; indeed, the battery pack 22 can be located anywhere on the fastener tool 10. In addition, although the energy storage device is illustrated as being a battery pack, embodiments of this patent application are not limited to battery packs being the energy storage device. That is, in some embodiments, the fastener tool 10 may include a cord and a plug for plugging into a common household AC outlet. While the fastener tool 10 is described as being electrically powered by a suitable power source or energy storage device, such as the battery pack 22, a person of ordinary skill in the art would appreciate that this patent application, in its broader aspects, may apply to other powered fastening tools.

The fastener tool 10 may have multiple modes of operation. For example, one mode of operation of the fastener tool 10 may be a sequential fire mode (or sequential operational mode) in which the contact trip assembly 21 is first be abutted against a workpiece (so that the contact trip sensor/switch CTS generates the contact trip sensor signal and thereafter the trigger switch TS is actuated to generate the trigger signal).

Another mode of operation of the fastener tool 10 may be a mandatory bump feed mode (or bump operational mode) in which the trigger switch TS is first actuated to generate the trigger signal and thereafter the contact trip assembly 21 is abutted against a workpiece so that the contact trip sensor/switch CTS generates the contact trip sensor signal.

Yet another mode of operation may be a combination mode that permits either sequential fire or bump feed wherein no particular sequence is required (i.e., the trigger sensor signal and the contact trip sensor signal may be made in either order or simultaneously).

The fastener tool 10 may also include a mode selector switch. The mode selector switch may be a switch that produces a mode selector switch signal that is indicative of a desired mode of operation of the fastener tool 10. The signals generated by the contact trip sensor/switch CTS, the mode selector switch, and the trigger switch TS are received and processed by the controller 38. As is generally known, one or more, or all, of the switches mentioned herein may be microswitches.

The controller 38 may be configured such that the fastener tool 10 will be operated in a given mode, such as the bump feed mode, only in response to the receipt of a specific signal from the mode selector switch. For example, the placement of the mode selector switch in a first position causes a signal of a predetermined first voltage to be applied to the controller 38, while the placement of the mode selector switch in a second position causes a signal of a predetermined second voltage to be applied to the controller 38. Limits may be placed on the voltage of one or both of the first and second voltages, such as ± a value or a percentage of voltage, so that if the voltage of one or both of the signals is outside the limits the controller 38 may default to a given feed mode (e.g., to the sequential feed mode) or operational condition (e.g., inoperative).

The fastener tool 10 may be configured to coordinate the feed cycle and the drive cycle. That is, the fastener tool 10 may be configured to coordinate the feed cycle and the drive cycle such that the driver 26 is less likely to encounter a jam scenario where the nails/fasteners are being fed into the space that is occupied by the driver blade portion of the driver 26, while the driver 26 is still going through its own motions.

For the sake of completeness, other features may be provided on the fastener tool 10. As shown in FIG. 1, for example, a stall release lever 140 may be provided on an outside of the housing 16 to address a stall condition or problem with regards to firing the fastener tool 10, e.g., a jam. The stall release lever 140 includes a lever arm 142, a spool, and a flange. The spool and the flange rotate with the lever arm. The stall release lever may be activated by a user/operator in an instance when a drive cycle is not completed. For example, when attempting to drive a nail into a hard material and insufficient power is available to fully sink the nail, the fastener tool 10 may stall or jam. Other cases for an incomplete drive cycle may include operational anomalies such as improper nail loading, non-conforming nails being used, or worn or broken components in the tool. In operation, when a stall or jam occurs, the operator may rotate the lever arm in a counterclockwise direction to release the load on the activation system, thereby moving the roller assembly 40 (as described in detail in the incorporated '323 Patent) away from the driver 26. Thus, the components in the fastener tool 10 are able to return to their respective home positions.

The present patent application and its various embodiments as described above uniquely address the observed, noted and researched findings and improve on the prior and current state of the art systems. The listed products, features and embodiments as described in the present patent application should not be considered as limiting in any way.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

The illustration of the embodiments of the present patent application should not be taken as restrictive in any way since a myriad of configurations and methods utilizing the present patent application can be realized from what has been disclosed or revealed in the present patent application. The systems, features and embodiments described in the present patent application should not be considered as limiting in any way. The illustrations are representative of possible construction and mechanical embodiments and methods to obtain the desired features. The location and/or the form of any minor design detail or the material specified in the present patent application can be changed and doing so will not be considered new material since the present patent application covers those executions in the broadest form.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by a person of ordinary skill in the art in the context of the various elements, components, regions, layers and/or sections being described.

The foregoing illustrated embodiments have been provided to illustrate the structural and functional principles of the present patent application and are not intended to be limiting. To the contrary, the present patent application is intended to encompass all modifications, alterations and substitutions within the spirit and scope of the appended claims.

What is claimed is:

1. A fastener tool that drives a fastener into a workpiece, the fastener tool comprising:

a housing;

a nose assembly connected with the housing, the nose assembly having a drive channel into which the fastener to be driven into the workpiece is fed, the drive channel having a drive axis;

a driver configured to be movable along the drive axis to engage and drive the fastener in the drive channel into the workpiece;

a motor disposed in the housing;

a flywheel disposed in the housing, the flywheel configured to be driven by the motor and configured to transmit energy to the driver to cause the driver to move along the drive axis;

one or more sensors operatively connected to at least one of the flywheel and the motor, the one or more sensors configured to measure and output at least (a) a signal indicative of an angular velocity of the flywheel or (b) a signal indicative of a characteristic of the motor; and a controller having one or more processors, the controller operatively connected to the motor and the one or more sensors, wherein the controller is configured to enable the engagement between the flywheel and the driver at a start of a drive commencement such that the energy is transferred from the flywheel to the driver for driving the fastener in the drive channel into the workpiece, and wherein the controller is configured to adjust a speed of the driver based on a difference between a first angular velocity of the flywheel measured by the one or more sensors at or before the start of the drive commencement and a second angular velocity measured by the one or more sensors after the start of the drive commencement, wherein the second angular velocity includes one or more of the following:

(a) a first dynamic measurement point in time that is after the start of the drive commencement, wherein the first dynamic measurement point is determined when an angular acceleration of the flywheel meets a flywheel angular acceleration predetermined threshold; or (b) a second dynamic measurement point in time that is after the start of the drive commencement, wherein the second dynamic measurement point is determined when an angular jerk of the flywheel meets a flywheel angular jerk predetermined threshold.

2. The fastener tool of claim 1, wherein the controller is configured to adjust the speed of the driver to varying characteristics of the workpiece, and wherein the varying characteristics of the workpiece include one or more of the following: a thickness of the workpiece, a positioning of the workpiece with respect to the fastener tool, a material of the workpiece, a density of the workpiece, or a type of a joint in the workpiece.

3. The fastener tool of claim 1, wherein the fastener tool further comprises a depth adjustment assembly that is configured to enable a user to perform at least one of the following:

select a depth adjustment setting to adjust a depth at which the fastener tool drives the fastener into the workpiece, wherein the controller is configured to adjust the speed of the driver to varying user adjustable depth adjustment settings of the depth adjustment assembly, and adjust a penetration depth of the fastener into the workpiece.

4. The fastener tool of claim 1, wherein the controller is configured to adjust the speed of the driver to varying characteristics of the fastener, and wherein the varying characteristics of the fastener include one or more of the following: a length of the fastener, a material of the fastener, or a thickness of the fastener.

5. The fastener tool of claim 1, wherein the first angular velocity includes a set measurement point in time at or before the start of the drive commencement.

6. The fastener tool of claim 1, further comprising an actuator that is operatively connected to the controller and is configured to move the driver into engagement with the flywheel such that the energy is transferred from the flywheel to the driver and to disengage the flywheel from the driver;

wherein the actuator is a drive actuator, and wherein the drive actuator includes a drive solenoid.

7. The fastener tool of claim 6, further comprising a feed actuator and a feeder;

wherein the controller is operatively connected to the feed actuator and the feeder and the controller is configured to implement a firing sequence for driving a lead fastener into the workpiece using the driver and for feeding the lead fastener into the nose assembly using the feeder, wherein the feed actuator includes a feed solenoid and is configured to move the lead fastener into the nose assembly; and wherein the firing sequence includes a first electric pulse to the drive actuator and a second electric pulse to the feed actuator.

8. The fastener tool of claim 7, further comprising a magazine coupled to the nose assembly and disposed in the housing, wherein the magazine is configured to carry a supply of fasteners through a feed channel along a feed channel direction toward the nose assembly, and wherein the feeder is operatively connected with the magazine and is configured to advance the fastener in a feed direction through the magazine and into the drive channel prior to driving the fastener into the workpiece.

9. The fastener tool of claim 1, wherein the controller is configured to control a supply of power from a power source to the motor to initiate a drive stroke, wherein the drive stroke includes a time from which the driver is activated to engage and drive the fastener in the drive channel into the workpiece to a time until the driver is retracted along the drive axis to clear the drive channel and to allow for feeding of a subsequent fastener into the drive channel.

* * * * *